US012152434B2

(12) United States Patent
Möller et al.

(10) Patent No.: US 12,152,434 B2
(45) Date of Patent: Nov. 26, 2024

(54) SPACER FOR INSULATED GLASS UNITS

(71) Applicant: Ensinger GmbH, Nufringen (DE)

(72) Inventors: Michael Möller, Cham (DE); Klaus Esser, Oberhausen (DE); Reimar Olderog, Mötzingen (DE); Heinz Raunest, Weiding (DE); Bernhard Königsberger, Tiefenbach (DE); Peter Runze, Schwandorf (DE); Christian Helfert, Roth (DE); Stefan Dierneder, Naarn (AT); Leopold Mader, Neuhofen/Ybbs (AT); Marc Rehling, Steinenbronn (DE)

(73) Assignee: Ensinger GmbH, Nufringen (DE)

( * ) Notice: Subject to any disclaimer, the term of this patent is extended or adjusted under 35 U.S.C. 154(b) by 338 days.

(21) Appl. No.: 17/668,551

(22) Filed: Feb. 10, 2022

(65) Prior Publication Data

US 2022/0268092 A1 Aug. 25, 2022

Related U.S. Application Data

(63) Continuation of application No. PCT/EP2020/065685, filed on Jun. 5, 2020.

(30) Foreign Application Priority Data

Aug. 12, 2019 (DE) ..................... 10 2019 121 690.7

(51) Int. Cl.
*E06B 3/663* (2006.01)

(52) U.S. Cl.
CPC ...... *E06B 3/66361* (2013.01); *E06B 3/66366* (2013.01); *E06B 2003/6638* (2013.01); *E06B 2003/66395* (2013.01)

(58) Field of Classification Search
CPC .. E06B 3/663; E06B 3/66304; E06B 3/66314; E06B 3/66319; E06B 3/66328;
(Continued)

(56) References Cited

U.S. PATENT DOCUMENTS 2,525,717 A * 10/1950 Ottenheimer ........... E06B 3/677 52/204.595
3,008,197 A * 11/1961 Trzyna ................ E06B 3/66357 52/309.3
(Continued)

FOREIGN PATENT DOCUMENTS

DE 42 26 883 A1 3/1993
DE 198 07 454 A1 8/1999
(Continued)

OTHER PUBLICATIONS

International Search Authority, International Search Report and Written Opinion in International Patent Application No. PCT/EP2020/065685, mailed on Sep. 11, 2020.

*Primary Examiner* — Kyle J. Walraed-Sullivan
(74) *Attorney, Agent, or Firm* — Leydig, Voit & Mayer, Ltd.

(57) ABSTRACT

A spacer is provided that is shapable into a spacer frame, and during manufacture of an insulating glass unit, can be mounted on the glass panes. The spacer is formed having an inner surface, an outer surface and two lateral surfaces extending at either side of the spacer from the inner surface to the outer surface, and comprises a profiled body. The profiled body comprises two mutually spaced lateral faces running parallel to its longitudinal direction and a base body that extends between the lateral faces and has an outer and an inner face. The profiled body comprises at least in one part of its volume a quantity of particulate desiccant that is embedded in a plastics material. The spacer is coilable about
(Continued)

an axis, perpendicularly to the lateral surfaces, and takes a flexurally rigid form in a plane perpendicular to the lateral surfaces.

20 Claims, 17 Drawing Sheets

(58) Field of Classification Search
CPC ............. E06B 3/66333; E06B 3/66342; E06B 3/66347; E06B 3/66352; E06B 3/66361; E06B 3/66366; E06B 2003/6638; E06B 2003/66385; E06B 2003/6639; E06B 2003/66395
See application file for complete search history.

(56) References Cited

U.S. PATENT DOCUMENTS

| | | | | | |
|---|---|---|---|---|---|
| 3,837,129 | A * | 9/1974 | Losell | E06B 5/10 | 428/34 |
| 3,935,683 | A * | 2/1976 | Derner | E06B 3/66366 | 52/786.13 |
| 4,080,482 | A * | 3/1978 | Lacombe | E06B 3/667 | 52/786.13 |
| 4,649,685 | A * | 3/1987 | Wolf | E06B 3/66342 | 52/204.593 |
| 4,831,799 | A * | 5/1989 | Glover | E06B 3/66328 | 52/786.13 |
| 5,079,054 | A * | 1/1992 | Davies | B29C 70/52 | 428/35.8 |
| 5,094,055 | A * | 3/1992 | Berdan | E06B 3/66314 | 52/204.593 |
| 5,290,611 | A * | 3/1994 | Taylor | E06B 3/66319 | 428/167 |
| 5,302,425 | A * | 4/1994 | Taylor | E06B 3/66319 | 428/167 |
| 5,447,761 | A * | 9/1995 | Lafond | E06B 3/66328 | 52/786.13 |
| 5,496,598 | A * | 3/1996 | Delisle | E06B 3/66319 | 428/595 |
| 5,553,440 | A * | 9/1996 | Bulger | E06B 3/66309 | 52/786.13 |
| 5,568,714 | A * | 10/1996 | Peterson | E06B 3/66323 | 52/843 |
| 5,962,090 | A * | 10/1999 | Trautz | E06B 3/66319 | 428/35.8 |
| 6,131,364 | A * | 10/2000 | Peterson | E06B 3/66323 | 52/786.13 |
| 6,148,563 | A * | 11/2000 | Roche | E06B 3/66366 | 49/501 |
| 6,339,909 | B1 * | 1/2002 | Brunnhofer | E06B 3/66319 | 52/786.13 |
| 6,537,629 | B1 * | 3/2003 | Ensinger | E06B 3/66323 | 428/167 |
| 6,823,644 | B1 * | 11/2004 | Peterson | E06B 3/66314 | 52/786.13 |
| 7,827,760 | B2 * | 11/2010 | Brunnhofer | E06B 3/66319 | 52/786.13 |
| 8,756,879 | B2 * | 6/2014 | Cempulik | E04C 1/42 | 52/204.595 |
| 2004/0079047 | A1 * | 4/2004 | Peterson | E06B 3/66323 | 52/786.13 |
| 2005/0100691 | A1 * | 5/2005 | Bunnhofer | E06B 3/66319 | 428/36.9 |
| 2006/0013979 | A1 * | 1/2006 | Ensinger | B01J 20/18 | 428/188 |
| 2006/0037262 | A1 * | 2/2006 | Siebert | E06B 3/66314 | 52/204.593 |
| 2007/0227097 | A1 * | 10/2007 | Gallagher | E06B 3/66314 | 52/786.13 |
| 2007/0261359 | A1 * | 11/2007 | Buchanan | E06B 3/67308 | 52/684 |
| 2007/0261795 | A1 * | 11/2007 | Rosskamp | E06B 3/67308 | 156/556 |
| 2008/0053037 | A1 * | 3/2008 | Gallagher | E06B 3/66314 | 52/786.13 |
| 2009/0019815 | A1 | 1/2009 | Ensinger | | |
| 2009/0120018 | A1 * | 5/2009 | Trpkovski | E06B 3/66314 | 52/204.593 |
| 2009/0139164 | A1 * | 6/2009 | Prete | E06B 3/66366 | 52/204.593 |
| 2009/0243802 | A1 | 10/2009 | Wolf et al. | | |
| 2009/0301006 | A1 * | 12/2009 | Karrer | E06B 3/56 | 52/204.6 |
| 2010/0011703 | A1 * | 1/2010 | Seele | E06B 3/663 | 52/786.1 |
| 2010/0330310 | A1 * | 12/2010 | Lenhardt | E06B 3/66361 | 428/34 |
| 2011/0072961 | A1 * | 3/2011 | Jungkuist | F41H 5/0407 | 89/905 |
| 2012/0055010 | A1 * | 3/2012 | Milburn | E06B 3/673 | 29/527.1 |
| 2012/0094040 | A1 * | 4/2012 | Mader | E06B 3/66361 | 428/34.1 |
| 2012/0137608 | A1 * | 6/2012 | Plant | E06B 3/66314 | 52/204.593 |
| 2012/0295043 | A1 | 11/2012 | Ensinger | | |
| 2012/0297707 | A1 * | 11/2012 | Lenz | E06B 3/66347 | 52/204.593 |
| 2013/0319598 | A1 * | 12/2013 | Grommesh | E06B 3/6775 | 428/419 |
| 2014/0165484 | A1 * | 6/2014 | Zurn | E06B 3/66361 | 428/595 |
| 2014/0352841 | A1 * | 12/2014 | Zurn | E06B 3/6775 | 141/8 |
| 2016/0108659 | A1 * | 4/2016 | Stark | B32B 7/14 | 52/786.1 |
| 2016/0138326 | A1 * | 5/2016 | Kuster | E06B 3/66366 | 52/204.595 |
| 2016/0198431 | A1 | 7/2016 | Pattabirman et al. | | |
| 2016/0201381 | A1 * | 7/2016 | Kuster | E06B 3/66361 | 52/204.593 |
| 2017/0152701 | A1 * | 6/2017 | Kuster | E06B 3/67339 | |
| 2017/0328119 | A1 * | 11/2017 | Kuster | E06B 3/663 | |
| 2018/0073292 | A1 * | 3/2018 | Graham | E06B 3/66328 | |
| 2018/0224689 | A1 * | 8/2018 | DeMiglio | G02F 1/13392 | |
| 2018/0298674 | A1 * | 10/2018 | Runze | E06B 3/221 | |
| 2019/0226271 | A1 * | 7/2019 | Briese | E06B 3/66352 | |
| 2019/0257139 | A1 * | 8/2019 | Howes | E06B 3/66 | |
| 2019/0383087 | A1 * | 12/2019 | Hermens | E06B 3/66352 | |
| 2021/0159354 | A1 * | 5/2021 | Sala | E06B 3/66314 | |
| 2022/0127900 | A1 * | 4/2022 | Briese | F16B 7/042 | |
| 2022/0186550 | A1 * | 6/2022 | Fleury | E06B 3/66366 | |

FOREIGN PATENT DOCUMENTS

| | | | |
|---|---|---|---|
| DE | 103 11 830 | A1 | 9/2004 |
| DE | 696 33 132 | T2 | 8/2005 |
| DE | 10 2010 010 432 | B3 | 11/2011 |
| EP | 0 261 923 | A2 | 3/1988 |
| EP | 0 865 560 | B1 | 8/2004 |
| EP | 2 146 039 | A2 | 1/2010 |
| WO | 2004/081331 | A1 | 9/2004 |
| WO | 2007/137719 | A1 | 12/2007 |
| WO | 2013/120505 | A1 | 8/2013 |
| WO | 2014/198431 | A1 | 12/2014 |
| WO | 2015/059729 | A1 | 4/2015 |

* cited by examiner

SPACER FOR INSULATED GLASS UNITS

CROSS-REFERENCE TO RELATED APPLICATIONS

This patent application is a continuation of international patent application no. PCT/EP2020/065685, filed on Jun. 5, 2020, which claims the benefit of German patent application no. 10 2019 121 690.7, filed on Aug. 12, 2019, which are each incorporated by reference.

BACKGROUND OF THE INVENTION

The invention relates to a spacer for insulating glass units, and to insulating glass units having two or more glass panes that are held at a predetermined spacing by a frame formed by the spacer.

The spacer has an inner surface, an outer surface and two lateral surfaces that extend on either side of the spacer from the inner surface to the outer surface.

Conventional spacers are typically equipped with one or more receiving chambers for desiccant that, in insulating glass units, serves to keep an inner space between the panes dry and thus prevent condensate from being deposited in the inner space between the panes.

An example of this is known from DE 198 07 454 A1. In the case of these spacers, the cavity forming the receiving chamber is filled with a predetermined quantity of desiccant when the spacer frame is formed.

As an alternative, spacers having desiccant particles that are integrated into the spacer profiled body or its binder matrix are also known, for example from WO 2004/081331 A1. The spacers are either cut to length and joined to form a frame using connection elements, or are bent into a frame from a single piece. Here, the binder matrix is formed from a plastics material that is permeable to water vapour.

EP 0 261 923 A2 discloses coilable spacers, in which a spacer is formed from an expanded elastomer material containing a desiccant. Coilable spacers are also designated as windable or rollable below.

Further known are spacers suitable for the manufacture of triple insulating glass units, which have in the central region, between lateral faces against which the outer glass panes abut, in addition a receiving region for a third, central glass pane. An example of this is known from WO 2014/198431 A1.

In the case of spacers sold in the form of ready lengths, the problem arises of handling, and of the relatively short length thereof, which is typically limited to approximately 5 to 6 m. Making further use of offcut lengths makes manufacture of the insulating glass units relatively burdensome. Moreover, transport of the spacers, which are typically packed within so-called stanchions, is relatively complex and costly because of the dimensions of the stanchions, which exceed the typical dimensions of pallets.

Easier to handle, in particular also during transport, in this regard are coilable spacers made from an elastomer material and commercially available, for example from Edgetech Europe GmbH under the mark SuperSpacer®, which can be provided in relatively long lengths. However, these spacers not only have relatively low flexural strength under forces perpendicular to the outer surface but also have relatively low flexural strength and moreover a relatively low Shore hardness under forces perpendicular to the lateral surfaces. This has the result that the conventional assembly with rigid (hollow profile) spacers, of a lateral application of a primary butyl sealant and the compression of this butyl compound to a layer thickness of approximately 0.2 to approximately 0.5 mm, is not possible without deforming the spacer, or is possible only under difficult conditions.

So that the insulating glass units can be handled before a secondary sealant, typically applied at the pane edge, has cured, additional assembly aids are typically used, for example in the form of laterally applied acrylic adhesives, which prevent the spacers from slipping in relation to the glass panes and also prevent the glass panes from slipping in relation to one another during assembly of the insulating glass units.

In the case of these spacers, a butyl primary sealant is used in order to keep within the maximum permitted moisture absorption and gas loss rate required by DIN EN 1279 Parts 2 and 3 (2018). Because the conventional butyl cannot be compressed between the spacer and the glass panes under the usual forces, as a result of the relatively low Shore hardness and relatively low flexural strength when force is introduced perpendicularly to the lateral faces, "soft" butyl materials are typically used in order to ensure that all the cavities and porous regions (for example of the glass surface) are filled.

In the case of spacers having receiving chambers for desiccant, when the spacers are processed to create a spacer frame, introduction of the desiccant in granule form is an additional burden. This is conventionally done in a separate work step on a so-called automatic desiccant filling unit.

BRIEF SUMMARY OF THE INVENTION

In view of the aspects mentioned above, the object of the present invention is to provide a spacer that is transportable simply, that can easily be shaped into a spacer frame, and that during manufacture of the insulating glass unit can be mounted on the glass panes easily and yet precisely.

This object is achieved by a spacer for insulating glass units as defined in claim 1.

The inner and/or outer surface of the spacer according to the invention may be formed by the inner and/or outer face of the base body of the profiled body. In the condition mounted in the insulating glass unit, the inner surface of the spacer according to the invention faces the inner space between the panes, while the outer surface is positioned at the outer edge region of the insulating glass unit, remote from the inner space between the panes.

The lateral faces of the profiled body may also form the lateral surfaces of the spacer if the spacer is formed without a barrier layer abutting against the outside of the profiled body, or if the barrier layer abutting against the outside does not extend over the lateral faces of the profiled body. If the spacer has a barrier layer that abuts against the outside of the profiled body and also extends over at least some of the regions of the lateral faces of the profiled body, then the lateral surfaces of the spacer according to the invention are formed partly or entirely, depending on the extent of the barrier layer, by the surface of the barrier layer that is remote from the profiled body.

In the context of the present invention, the term "coilable spacers" is understood to mean spacers that are coilable onto a core or mandrel having a diameter of approximately 200 mm to approximately 1 000 mm, in particular approximately 300 mm to approximately 500 mm, without substantial plastic deformation. Once the previously wound spacers are uncoiled, they can preferably be returned to their original geometry with only little effort, and are easily processable in this form.

DETAILED DESCRIPTION OF THE INVENTION

Preferably in this context, under the force of a test die acting in the centre of a loading span at 50 N, by comparison with an unloaded condition the spacer according to the invention is deflected by approximately 1 mm or more, more preferably approximately 1.3 mm or more, in particular approximately 1.7 mm or more. Typically, the upper limit of deflection is approximately 25 mm, preferably approximately 10 mm, more preferably approximately 5 mm. In each case, the deflection is measured in the centre of the loading span on the outer surface of the spacer as its outer surface lies on two supporting bodies at a loading span of 100 mm, as measured in the longitudinal direction of the spacer. The value determined here also substantially corresponds to the travel performed by the test die. The force of 50 N is introduced into the spacer perpendicularly to a plane running perpendicularly to the lateral surfaces, by means of a partly cylindrical die with a planar contour.

If the spacer according to the invention lies with a lateral surface on two supporting bodies, then because of its flexural strength it is deflected significantly less under the force of a test die in a plane perpendicular to the lateral surfaces than if it is supported on the outer surface under the same force perpendicular to the outer surface. For the sake of ease of handling, under a force of 100 N acting perpendicularly to the lateral surface in the centre of a loading span, the spacers according to the invention are preferably deflected by approximately 10 mm or less, more preferably approximately 5 mm or less, most preferably approximately 3 mm or less, by comparison with an unloaded condition. The deflection is measured at a lateral surface of the spacer as this surface lies on two supporting bodies at a loading span of 100 mm, as measured in the longitudinal direction of the spacer. The value determined here substantially also corresponds to the travel performed by the test die. Spacers of this kind are sufficiently stable in the transverse direction and can be handled with particular ease during manufacture of the insulating glass units. Above all, the primary butyl sealant can also be compressed uniformly and thus a uniform and secure sealing of the intermediate space of the insulating glass unit can be achieved.

When the deflection is measured with the spacer lying with a lateral surface on the supporting bodies, a partly cylindrical die with a planar contour is used, wherein the force is introduced at the opposite lateral surface to the lateral surface that is lying on the supporting bodies.

The measurements of deflection that are described above (known as the three-point bend test) are carried out substantially analogously to the measurement of flexural strength in conformance with DIN EN ISO 178 (2013-09), as explained in more detail below in the course of the detailed description.

The profiled bodies of the spacers according to the invention contain a quantity of particulate desiccant, at least in one part of their volume, with the result that typically the introduction of desiccant into a cavity in the spacer when the spacer frame is manufactured and mounted to form insulating glass units can be dispensed with. Thus in particular it can be avoided that desiccant granules or dust get into the intermediate space between the panes, as may occur when desiccant granules are put in by being poured in loose. Moreover, the spacer according to the invention can be manufactured without a closed receiving chamber for the desiccant, with the result that manufacture of the spacer or its profiled body, which is performed in particular by an extrusion method, is simplified.

The particulate desiccant is preferably introduced into the plastics material of the profiled body by extrusion. This on the one hand allows the compressive strength of the profiled body and hence of the spacer to be improved, and on the other, surprisingly, does not have a noticeable negative effect on the coilability of the spacer.

Because of the coilability of the spacers according to the invention, long lengths thereof can be provided and transported in a minimal volume, with the result that it is also possible economically to pack the spacers provided in this way such that they are impermeable to water vapour. In contrast, with spacers that are manufactured and sold in the form of ready lengths, this presents major problems and is frequently not even achievable in an economically viable manner.

There is also the problem, in the case of the spacers supplied in the form of ready lengths, that for continuous processing or during the manufacture of the spacer frame they have to be repeatedly joined together using longitudinal connectors or put together to form a frame with the aid of angled corner pieces.

For this reason, it is necessary for the spacer to have a cavity into which these connection elements can be pushed. Thus, if desiccant was incorporated into the material of these hollow-profile spacers, then in order to achieve an identical mass of desiccant it would have to be incorporated in a relatively high concentration, or the overall height of the spacers would have to be made comparatively greater. A higher proportion of desiccant typically has a negative effect on the mechanical properties, and a greater overall height results in a worsening of the Psi value in the so-called Uw value calculation of windows.

Finally, with the spacers according to the invention the formation of the corner regions of spacer frames is simplified because of the limited flexural strength that is preferably provided. In particular, the egress of desiccant, tearing open and indeed widening are avoided, and the seal reaches into the corner regions of the spacer frame better than in the case of the prior art. In addition, by machining the profiled bodies of the spacers according to the invention it is also possible to make the corners a more pleasing shape and to give them an acute angle, for example by punching or milling.

The flexural strength of the spacers according to the invention in a plane perpendicular to the lateral surfaces (greater transverse rigidity) does not only enable easy handling of the spacers according to the invention but also allows the use of conventional primary butyl sealants and the compression thereof during manufacture of the insulating glass units.

Because the material is significantly stronger than conventional flexible spacers, it is possible to fix fittings in the intermediate spaces between the panes in a conventional manner, by using screws or a staple gun.

For the purpose of further simplifying handling of the spacers according to the invention, reinforcing elements may be embedded in the plastics material of the profiled body.

Possible reinforcing elements are in particular particulate materials, fibre materials, sheet materials and/or materials in the form of wires. Appropriate selection of the reinforcing elements and their positioning in the profiled body of the spacer allows the effect of returning the spacer to a substantially linear starting position and its flexural strength to be optimised.

The reinforcing elements can additionally be used to limit the coefficient of linear thermal expansion a of the profiled body, preferably to approximately $5 \cdot 10^{-5}$/K or less, more preferably to approximately $3.5 \cdot 10^{-5}$/K. Ideally, it is close to the coefficient of linear thermal expansion of the glass pane.

In the case of preferred spacers according to the invention, on either side of the base body the profiled body has lateral walls that extend from the base body and beyond its inner face by approximately 0.5 mm or more, preferably approximately 1 mm or more, more preferably approximately 1.5 mm or more, and form the lateral faces of the profiled body. The lateral walls are preferably oriented substantially parallel to one another.

The spacers according to the invention in which the profiled body has lateral walls frequently have a substantially U-shaped cross section, as seen perpendicularly to the longitudinal direction. In the case of spacers intended for triple glazing, the cross section is frequently substantially in the shape of a double U or W, since a receiving groove is preferably provided on the inner surface between the lateral walls for the further (central) glass pane, as explained in more detail below.

Spacers according to the present invention preferably have a height H of approximately 6 mm or less, preferably approximately 5 mm or less. A small spacer height is advantageous for the coilability or rollability and improves the thermal properties (Psi values). Moreover, a small spacer height is frequently a preferred design feature in conjunction with a relatively low edge seal of the insulating glass units.

When determining the height H and the width B of a spacer profile according to the invention, the corresponding values of a rectangle that includes the cross section of the spacer are taken as a basis.

Spacers according to the invention typically have a width B of approximately 12 cm to approximately 44 mm, in particular approximately 14 mm to approximately 40 mm.

It is further preferable if the spacer according to the invention has an aspect ratio A, as seen in a cross section perpendicular to its longitudinal direction, that is defined as the quotient of the width B of the spacer and the height H of the spacer (A=B/H). In the case of spacers according to the invention that are intended for triple glazing, the width B preferably has a value of approximately 30 mm or more. The height H is preferably approximately 5 mm or less. The aspect ratio A in particular has a value of approximately 6 or more, preferably a value of approximately 7 or more, particularly preferably a value of approximately 8 or more.

In the case of spacers that are intended for double glazing, the aspect ratio A preferably has a value of approximately 3 or more, particularly preferably a value of approximately 4.5 or more. In such embodiments of the invention of this kind, however, the width B of the spacer is preferably approximately 24 mm or less, in particular 14 mm or 16 mm, while the height H typically has a value of approximately 5 mm or less.

Preferably, the plastics material of the profiled body of the spacer according to the invention comprises one or more polymers selected from polyolefins, polyketones, polyesters, vinyl polymers, polyamides or blends of these polymers, wherein the polymer or polymers is/are preferably polypropylene, polyethylene, styrene acrylonitrile copolymer (SAN), acrylic butadiene styrene copolymer (ABS), acrylic styrene acrylonitrile copolymer (ASA), polyvinyl chloride (PVC), polyamide 6 (PA6), polyamide 66 (PA66) and polyethylene terephthalate (PET). These polymers have sufficient permeability to water vapour, with the result that the desiccant embedded in the plastics material can take effect.

The particulate desiccant preferably comprises an absorbent selected from silicates, sulfates, oxides, in particular in the form of zeolite, calcium sulfate, silica gel, layered silicate, tectosilicate, phosphorus oxide, aluminium oxide, alkali metal oxide and/or alkaline earth metal oxide.

A particularly preferred particulate desiccant is a porous desiccant, wherein the average particle size is preferably approximately 3 angstroms. An example that may be mentioned here is 3A zeolite.

The particulate desiccant is preferably embedded in the plastics material in a proportion of approximately 10 weight % or more, more preferably approximately 25 weight % to approximately 65 weight %, in particular approximately 35 weight % to approximately 45 weight %, in each case in relation to the total weight of the profiled body of the spacer. These quantities are sufficient for the service lives that are typically to be expected of insulating glass units. Furthermore, these proportions still permit the spacers according to the invention to be manufactured with the desired coilabilty.

In particular, the particulate desiccant is inserted in the plastics material of the spacers according to the invention in the form of granules having an average particle size $D_{50}$ of approximately 1 mm or less, preferably approximately 0.5 mm or less, and/or in the form of powder having an average particle size $D_{50}$ of approximately 0.1 mm or less.

The average particle size $D_{50}$ can be determined for example visually, using sectional images or micrographs of the spacer profiles, or indeed from residue on ignition.

The spacers according to the invention preferably have a proportion of desiccant giving a moisture absorption capacity of approximately 2 g of water per 100 g of spacer or more, or more preferably approximately 4 g to approximately 30 g per 100 g of spacer.

The moisture absorption capacity can be determined in conformance with the standard DIN EN 1279-4 Annex F (2018).

The plastics material of the spacer according to the invention is preferably selected such that after storage in a standard atmosphere (50%±10% relative air humidity at a temperature of 23° C.±2° C.) for a storage period of 48 hours the moisture content of the spacer is approximately 50% or less of the maximum moisture absorption capacity, preferably approximately 30% or less of the maximum moisture absorption capacity, more preferably approximately 20% or less of the maximum moisture absorption capacity.

This makes it possible to ensure that the spacer or desiccant is not excessively preloaded with moisture when the insulating glass unit is put together, even if the spacer according to the invention is exposed to ambient air for a period. In particular, flexible spacers known from the prior art and made from expanded silicone absorb moisture very rapidly, so they can only be exposed to ambient air very briefly in order not to preload the desiccant excessively when the insulating glass unit is put together. In conformance with DIN EN 1279-6 (2018), in the case of a desiccant that is incorporated into a polymer matrix, the initial loading Ti before ageing must be less than 20% of the moisture absorption capacity (Tc). As a result, slower moisture absorption provides greater assurance during processing that excessive initial loading will be avoided.

It is possible for reinforcing materials, in particular in the form of glass fibres, to be embedded in the plastics material of the profiled bodies of the spacers according to the invention. The glass fibre content is preferably limited to approximately 25 weight % or less in relation to the total weight of the profiled body. More preferably, the glass fibre content is approximately 20 weight % or less, in particular approximately 15 weight % or less. Most preferred are glass fibre contents of approximately 10 weight % or less.

In view of the desired thermal insulation of the spacers according to the invention, the plastics material of the profiled body is selected such that there is a specific thermal conductivity of approximately 0.8 W/(m·K) or less, in particular approximately 0.5 W/(m·K) or less. Ideally, as low a thermal conductivity of the spacer as possible is sought. This can be achieved by selecting a suitable material for the plastics material and/or the porosity of the plastics material.

Preferably, the spacer according to the invention has on the inner surface a plurality of mutually spaced ribs that run parallel to the longitudinal direction and enlarge the spacer inner surface, which is arranged towards the inner space between the panes, such that water vapour is absorbed more quickly. Further, this structure can also have a positive effect on the appearance of the spacer.

The profiled body of the spacer according to the invention may furthermore comprise functional elements that are made in one piece therewith. Functional elements of this kind may serve to create further functionalities for the spacers according to the invention and for example take the form of grooves or projections. In addition to a modification, for example enlargement of the surface facing the inner space within an insulating glass unit in the mounted condition of the spacer, the possibility may be provided of additionally receiving desiccant bodies that where necessary serve to increase the moisture absorption capacity and/or easily to modify the appearance of the spacers in the mounted condition. This also makes it easily possible to modify the appearance of the inner surface of the spacer.

A further use for these functional elements is the assembly or the securing in position/guidance of further, separately manufactured functional elements, in particular fittings such as pleated or venetian blinds in the intermediate space between the panes.

The functional elements, including the further functional elements, may be selected from planar elements that in cross section are planar, curved, in particular part-circular, branched or angled in form, and/or elements that surround one or more cavities. Using functional elements of this kind, it is in particular also possible to provide receiving chambers for additional quantities of desiccant.

Further, the spacers according to the invention may have on the inner surface a continuous groove parallel to the lateral faces of the profiled body and at a spacing from each of them, for receiving a glass pane edge. This groove may in that case receive a further glass pane, with the result that triple glazing is producible.

Triple glazing can be manufactured particularly efficiently using the spacers according to the invention. In contrast to the use of two conventional spacers positioned parallel to one another, only a single spacer needs to be handled, and consequently an offset between the spacers of the one intermediate space between the panes and the spacer of the other intermediate space between the panes can be avoided. Moreover, with the spacer according to the invention thermal conduction is reduced, since the central pane does not interrupt the spacer according to the invention, which provides better insulation. Moreover, there are only two sealing planes on the lateral faces of the spacer according to the invention and not four as with the conventional use of one spacer per intermediate space between the panes.

Preferably, this groove is configured such that it can receive the edge of the further glass pane with force locking, wherein in the region of the groove the profiled body, or its base body, is preferably respectively made from one material, with the result that the glass pane edge is received in the groove with a clamping force sufficient to hold the spacer's own weight.

Further preferably, the spacer is also configured such that the clamping force of the groove is sufficient to compensate for the restoring forces of the uncoiled spacer. This considerably facilitates the manufacture of triple insulating glass units. With an appropriate dimensioning of the clamping force, it is furthermore possible to take up and transmit the weight of the central pane through the respectively perpendicular portions of the spacer frame, with the result that the lower part of the spacer frame does not have to bear any weight, or only some of the weight, of the central pane during assembly. With an appropriate configuration, it is then possible to dispense with support of the lower spacer frame part during manufacture. In the absence of sufficient clamping force, the lower part of the spacer frame and the bonding thereof to the glass panes would have to take up the entire weight of the central glass pane or, as described above, the central glass pane would have to be supported by the assembly device in order to prevent excessive deflection or displacement of the spacer in relation to the glass pane.

In addition, an adhesive can be provided in the groove in order additionally to hold the central glass pane in position.

The groove for receiving the edge region of a third glass pane may also be provided by a separately manufactured component that is connected to the profiled body by way of the functional elements.

Frequently, in such embodiments, the spacer according to the invention will have on the inner surface two mutually spaced projections that run parallel to the longitudinal direction of the profiled body and between which the groove is formed. In this way, a receptacle for the edge region of a third glass pane can easily be created, wherein the material requirement can be kept minimal and/or the coilability or rollability can additionally be optimised.

In preferred embodiments of the spacers according to the invention, there are formed in the region of the inner surface that is adjacent to its lateral surfaces projections that protrude substantially perpendicularly from the inner surface. In this way, the faces of the spacer that abut against the outer glass panes can be made larger, with the result that better sealing off of the pane inner space from the surroundings is achieved.

Frequently, the outer face of the base body takes a substantially planar form, while the inner face may take a likewise planar or concave form. The advantages of these configurations are that the overall height of the spacer according to the invention and the material requirement can be optimised.

The plastics material of the profiled body of the spacer according to the invention can have, at least in certain regions, a porosity having a pore structure of which the average pore size is preferably approximately 5 μm to approximately 150 μm, and wherein the pore volume is preferably approximately 40% by volume or less of the volume of the profiled body. The average pore size can be determined visually, for example using a sectional image or micrograph, or by X-ray tomography analysis. Various product properties, such as weight per metre, rigidity, strength (Shore hardness D), thermal conductivity, kinetics of moisture absorption and sound insulation, can be influenced in targeted manner by porosity.

In the case of preferred spacers according to the invention, the base body or the plastics material thereof has a Shore hardness D (measured in conformance with DIN ISO 1976-

1; 2012) of approximately 30 or more, preferably approximately 40 or more, most preferably approximately 50 or more.

Greater flexibility in the selection and composition of the plastics material of the profiled body and also of its geometric form while at the same time achieving coilability of the spacer can be achieved if recesses, in particular in slot or wedge form, that run transversely to the longitudinal direction of the profiled body at regular intervals are provided on the outer and/or inner face of the base body and/or the lateral faces of the profiled body.

Preferred spacers according to the invention have, on the outer surface and where appropriate also on at least parts of the lateral surfaces, a barrier layer that has a barrier effect in respect of gases, in particular in respect of argon, oxygen and water vapour.

Preferably, the barrier layer is selected from a metal foil having a thickness of preferably up to approximately 100 μm, more preferably having a thickness in the range of approximately 10 μm to approximately 50 μm, in particular in the range of approximately 10 μm to approximately 20 μm. Preferably, there is used as a barrier layer a rolled stainless steel foil or a rolled aluminium foil, a multiple-layer foil with a polymer-based backing film and at least one in particular vapour-deposited layer of metal, metal oxide or ceramic, a coating of platelet-like nanoparticles, in particular in the form of layered silicates, a flexible glass layer, a diffusion-inhibiting polymer film or a polymer film laminate.

A particularly preferred spacer according to the invention takes a form such that it is joinable in successive lengths in the longitudinal direction without auxiliary materials, in particular by means of positive locking and/or by substance-to-substance bond, wherein further preferably the spacer is joinable in the longitudinal direction by being hooked, clipped or welded. The elements for joining together end regions of the spacers may in particular be formed in the region of the base body and/or the lateral walls of the profiled body.

Furthermore, and as already mentioned in the introduction, the present invention relates to an insulating glass unit having two outer glass panes that are held at a predetermined spacing by a frame that is made from a spacer according to the invention.

In the case of preferred insulating glass units according to the invention, the two outer glass panes are bonded to the spacer according to the invention by means of a primary sealant in the region of the lateral surfaces of the spacer or the lateral faces of the profiled body, wherein the primary sealant is preferably selected from synthetic rubber, polyisobutylene, butyl rubber, polyurethane, silicone polymer, silane-modified polymer, polysulfide and polyacrylate.

A secondary sealant, in particular in the form of polysulfide, polyurethane, silicone or hot melt based on butyl, can be applied to the entire surface of an edge region of the insulating glass unit according to the invention, this edge region being formed by the outer surface of the spacer.

The sealant is applied in particular continuously from the one glass pane, which abuts on the outside against a lateral surface of the spacer, to the other glass pane, which abuts against the other lateral surface, preferably at a substantially constant thickness. The sealant abuts sealingly against the glass panes and against the outer surface of the spacer.

As an alternative, it may be provided for the sealant to be applied in an edge region of the insulating glass unit only in the regions of the outer surface of the spacer that are adjacent to the lateral surfaces and the glass panes abutting there on the outside. Preferably in this case, the secondary sealant is applied to the two outer glass panes in a wedge shape at the outer edge of the insulating glass unit.

In the case of preferred insulating glass units according to the invention, it may be provided for the application of primary and secondary sealant to extend continuously between the lateral surfaces of the spacer and the first and second glass panes and over the outer surface.

The bond formed by the glass panes and the spacer frame with the aid of the primary sealant is preferably of a strength sufficient to hold the spacer in position against the glass pane(s) by its own weight, initially without auxiliary materials.

In the case of spacers according to the invention that have a groove on the inner surface side, the edge of a third glass pane can easily be inserted in order to form a triple insulating glass unit.

There are no restrictions on the glass panes that are usable for the insulating glass units when using the spacers according to the invention. In particular, in addition to all types of commonly used glass panes, it is also possible to use glass panes made from polymer materials, in particular also plexiglass sheets. In the case of insulating glass units having more than two glass panes, it is also possible to use polymer films for the panes arranged in the centre.

BRIEF DESCRIPTION OF THE SEVERAL VIEWS OF THE DRAWINGS

These and further advantageous embodiments of the spacers according to the invention and of insulating glass units formed using them are explained in more detail below with reference to the drawing, in which, individually.

DETAILED DESCRIPTION OF THE DRAWINGS

FIGS. 1A-1D show a plurality of variants of a first embodiment of a spacer according to the invention, in a cross section perpendicular to the longitudinal direction of the spacers.

Figure 1A:
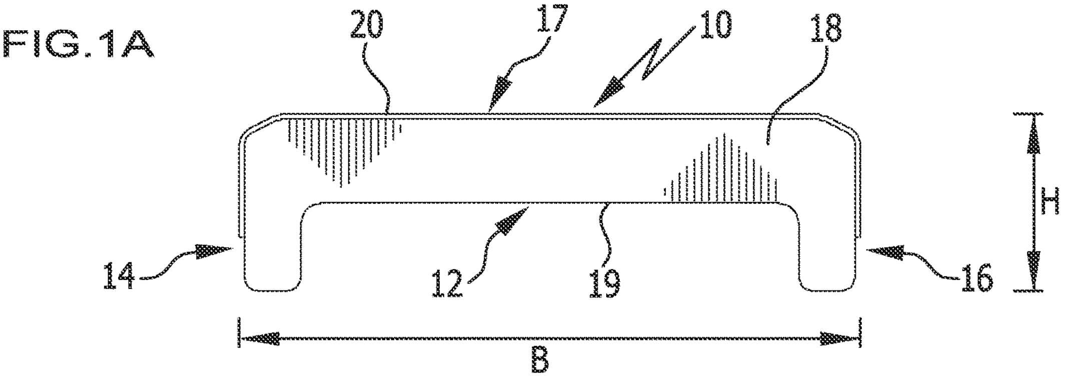
FIGS. 1A to 1D show a first embodiment of the spacer according to the invention, some in different installation situations in an insulating glass unit, and variants of this spacer.

When determining the height H and the width B of a spacer profile according to the invention, the corresponding values of a rectangle that includes the cross section of the spacer are taken as a basis, as indicated in FIG. 1A.

FIG. 1A shows a spacer 10 according to the invention that comprises a coilable profiled body 12 having a base body 18 and two mutually spaced lateral walls 14, 16 that run parallel to its longitudinal direction and, with the base body 18, form a U-shaped profile geometry. The lateral walls also form the lateral faces of the profiled body and, in part, the lateral surfaces of the spacer.

Arranged on the upper side of the base body 18 of the spacer 10 is a barrier layer or vapour barrier layer 20 that preferably extends from the one lateral face of the lateral wall 14, over the upper side (outer surface) 17 of the base body 18 to the second lateral face of the lateral wall 16. In the mounted condition, the outer surface is arranged adjacent to the outer edge of the insulating glass unit.

Suitable vapour barrier layers 20 are for example stainless steel foils having a thickness of approximately 10 μm to approximately 20 μm, and multiple-layer foils of which the individual layers are coated with metal and/or ceramic.

Here, the inner surface of the spacer 10 is formed by the inner surface 19 of the base body 18, which extends from the lateral wall 14 over the base body 18 to the lateral wall 16.

The plastics material from which the profiled body 12, together with its base body 18 and the lateral walls 14 and 16, is made is selected for example from polypropylene, polyethylene, styrene acrylonitrile copolymer (SAN), acrylic butadiene styrene copolymer (ABS), acrylic styrene acrylonitrile copolymer (ASA), polyvinyl chloride (PVC), polyamide 6 (PA6), polyamide 66 (PA66), polyethylene terephthalate (PET) or blends of these polymers. This preferred selection also applies to the spacers according to the invention described below.

For example, the plastics material contains glass fibres in a proportion of approximately 10 weight % and a desiccant in a proportion of approximately 40 weight %, in each case in relation to the total weight of the profiled body of the spacer.

Typically, the spacers according to the invention are manufactured by an extrusion method.

Figure 1B:
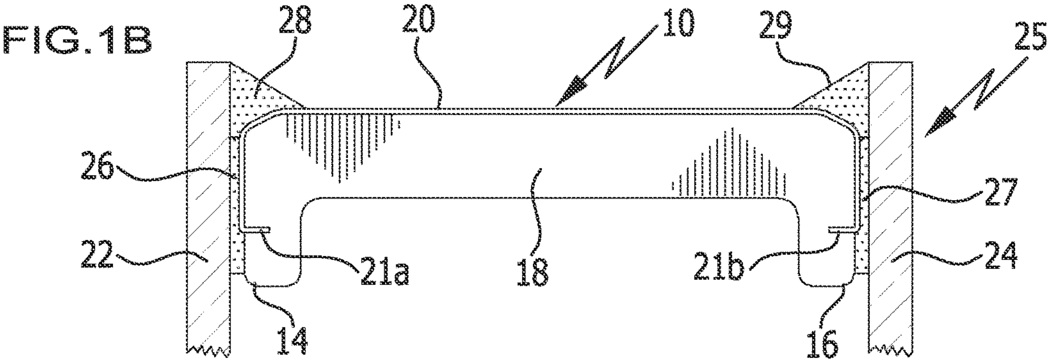

FIG. 1B shows the spacer 10 from FIG. 1A in a situation in which it is installed in an insulating glass unit 25, wherein a first glass pane 22 is arranged abutting against the lateral surface of the spacer 10, which is formed by the lateral wall 14 of the profiled body and the vapour barrier layer 20, and a second glass pane 24 is arranged abutting against the second lateral surface thereof, which is formed by the lateral wall 16 and the vapour barrier layer 20. Here, the ends 21*a*, 21*b* of the vapour barrier layer 20 are angled off in form and embedded in the plastics material of the base body 18, as known for example from DE 10 2010 006 127 A1.

The two glass panes 22, 24 are connected to the spacer 10 in a substance-to-substance bond at the lateral surfaces, in each case by way of a primary sealant such as a butyl compound 26, 27. The lateral butyl application (primary sealant) 26, 27 conventionally remains ductile, so pumping movements of the pane under load from wind and climatic load can be taken up. For this reason, it is not adequate for holding together the bond between the panes of the insulating glass unit in the long term. A further sealant, the secondary sealant, which cures and holds the insulating glass unit together is needed.

The two glass panes 22, 24 are held parallel and at a predetermined spacing from one another by the spacer 10. The upper side of the base body 18 here forms the outer side, that is to say the outer surface of the spacer 10 and the outer edge region of the insulating glass unit 25. In addition, a secondary sealant 28, 29 is applied in the region of the outer edge region, adjacent to the respective glass panes and the outer surface of the spacer 10.

The primary butyl sealant 26, 27 is applied substantially over the entire lateral faces of the lateral walls 14, 16 and the lateral surfaces of the spacer 10. The secondary sealant 28, 29 takes the form of a wedge-shaped configuration at the outer edge region of the insulating glass unit 25, as seen in cross section.

Figure 1C:
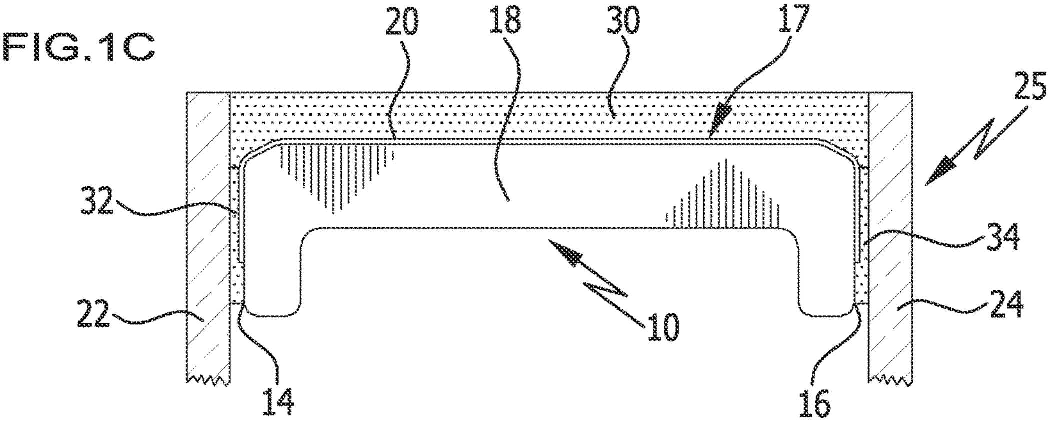

Another situation in which the spacer 10 from FIG. 1A is installed in an insulating glass unit 25 is illustrated in FIG. 1C. In this variant, a secondary sealant 30 is applied over the entire face of the vapour barrier layer 20 (outer surface) of the spacer 10, with the result that the secondary sealant 30 extends parallel to this layer, from the one glass pane 22 to the other glass pane 24. In this case, the glass panes 22, 24 are bonded to the lateral surfaces of the spacer and the lateral faces of the lateral walls 14, 16 by a primary sealant 32, 34.

Figure 1D:
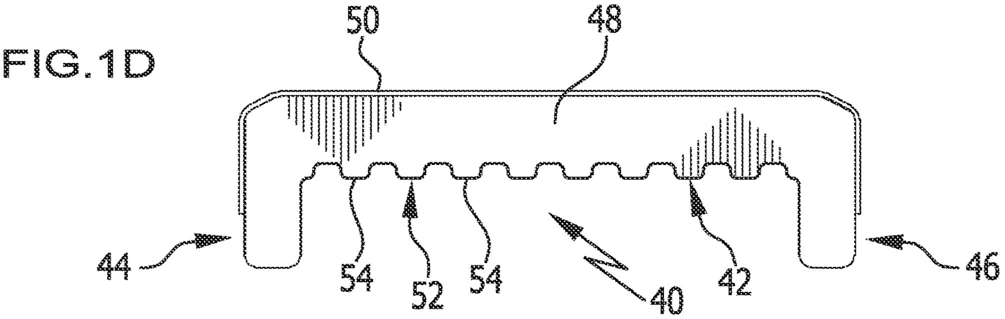

FIG. 1D shows a further variant of the coilable spacer 10 according to the invention in cross section, wherein the spacer is provided with the reference numeral 40 and comprises a profiled body 42 having a base body 48 and, arranged to either side thereof, lateral walls 44, 46 that, together with the base body 48 of the spacer 40, form a U-shaped profile cross section. Applied to the upper outer side of the spacer 40 is a barrier or vapour barrier layer 50 that extends from the first lateral face of the lateral wall 44, over the entire outer face of the base body 48 to the second lateral face of the lateral wall 46, and in large part covers both this and the first lateral face. On its downwardly oriented (in the installed condition of the spacer, oriented towards the inner space of the insulating glass unit) inner face 52 (inner surface of the spacer 40), the base body 48 has a structure comprising longitudinal ribs 54 that are distributed parallel to one another and spaced at regular intervals over the entire width of the inner face 52.

The parallel ribs 54 on the inner surface 52 of the spacer 40 make the surface on the inner side of the spacer larger and thus promote faster absorption of water vapour. Further, this structure may also have a positive effect on the appearance of the spacer.

Figure 2A:
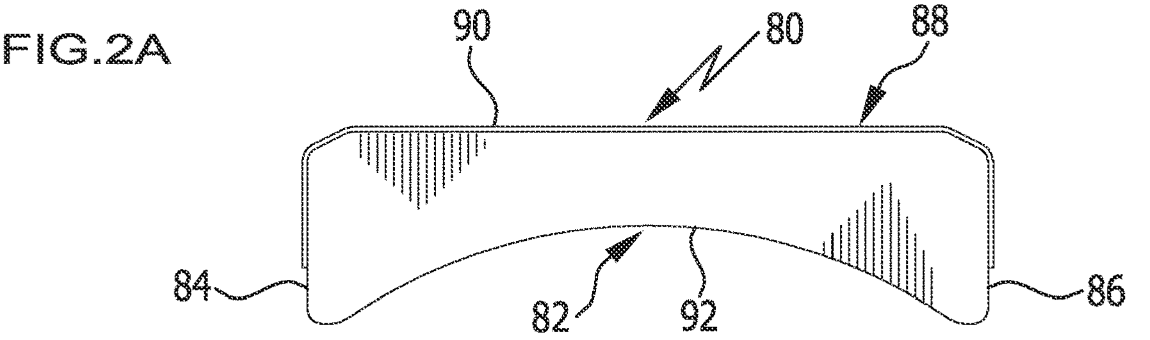
FIGS. 2A and 2B show a further embodiment of a spacer according to the invention and a variant thereof.

FIG. 2A shows a further embodiment of a spacer 80 according to the invention that comprises a profiled body 82 (which in this case at the same time represents the base body) that has a planar outer face 88 and parallel lateral faces 84 and 86 that are oriented perpendicularly to the outer face 88. Arranged on the outer face 88 is a vapour barrier layer 90 that extends from the first lateral face 84, over the outer face 88 to the second lateral face 86, and covers the majority of the lateral faces. The vapour barrier layer 90 forms the outer surface of the spacer 80 in the region of the outer face 88 and the majority of its lateral surfaces.

The inner face 92 of the profiled body 82, on the opposite side to the planar outer face 88, is concave in form and extends substantially from the first lateral face 84 to the second lateral face 86. The inner face 92 forms the inner surface of the spacer 80.

Figure 2B:
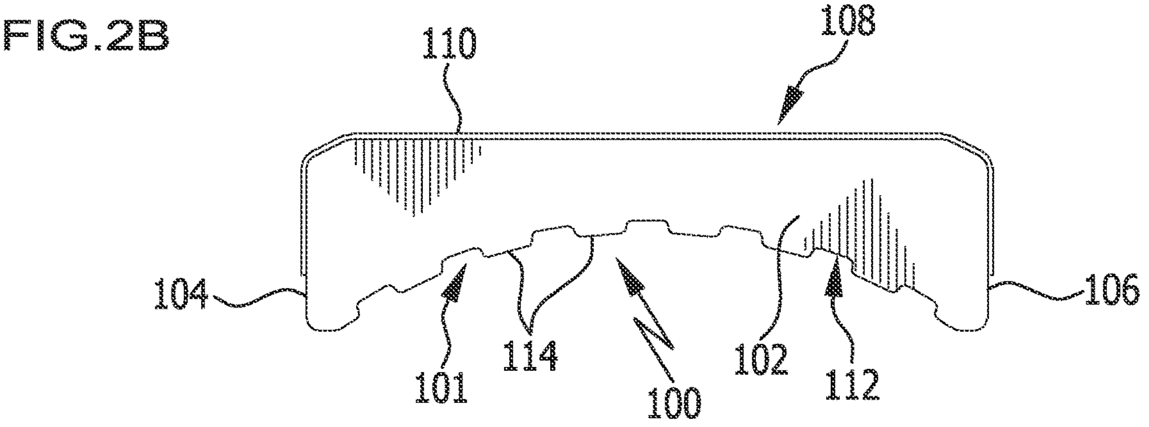

A modified embodiment of a spacer 100 according to the invention is shown in FIG. 2B. The spacer 100 has a profiled body 101 having a base body 102 that has a planar outer face 108 and, arranged perpendicularly thereto, a first and a second lateral face 104, 106. The spacer 100 has on its outer surface a vapour barrier layer 110 that extends over the outer face 108 and also in large part over the lateral faces 104, 106.

Further, the spacer 100 has an inner surface 112 that is concave in form and additionally has ribs 114 running parallel to the longitudinal direction of the spacer 100 and regularly spaced from one another.

Figure 3A:
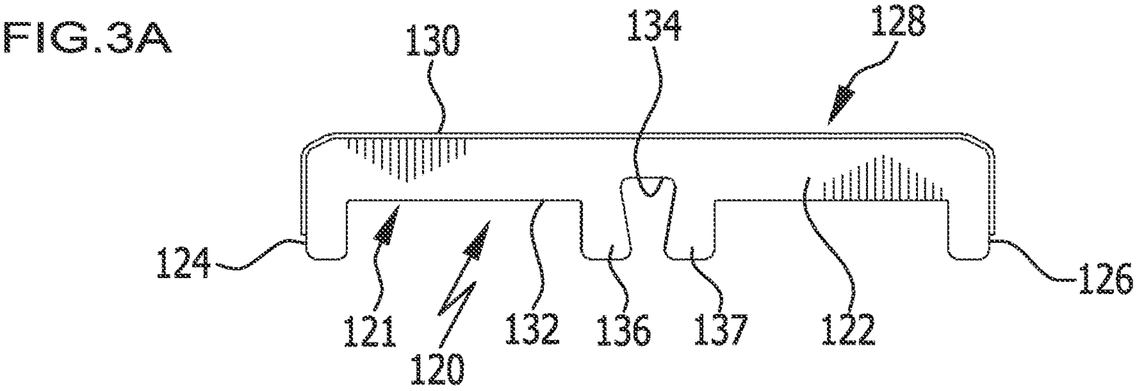
FIGS. 3A to 3D show a further embodiment of the spacer according to the invention, some in different installation situations in an insulating glass unit, and a variant of the spacer.

A further embodiment of the spacer according to the invention is shown in FIG. 3A, wherein the spacer 120 once again has a profiled body 121 having a base body 122 and, laterally delimiting this, lateral walls 124, 126. The lateral walls 124, 126 are oriented parallel to one another and substantially perpendicularly to a planar outer surface 128.

Provided on the outer surface 128 is a vapour barrier layer 130 that extends from the first lateral face of the lateral wall 124, over the outer face of the base body 122 to the second lateral face of the lateral wall 126, and likewise in large part covers the lateral faces.

The spacer 120 further has an inner surface 132 that takes a substantially planar form and has, centrally between the lateral walls 124, 126, a groove 134 that runs in the longitudinal direction of the spacer and is delimited by two parallel strip-like projections 136, 137. The spacing between the free ends of the projections 136, 137 is preferably selected to be somewhat smaller than the width of the groove in the region of its root. The groove 134 serves to receive a central, third glass pane (not illustrated) that divides the inner space within an insulating glass unit into two sub-volumes. In the embodiment of the spacer 120 shown, the sub-volumes of the inner space of the insulating glass unit are substantially the same size. In contrast hereto, as a result of an off-centre arrangement of the groove 134 and the two projections 136, 137 delimiting the groove 134, the sub-volumes may be of different sizes, in order for example to create an asymmetrical construction if this is made necessary by further requirements such as anti-drop protection, statics, etc.

Figure 3B:
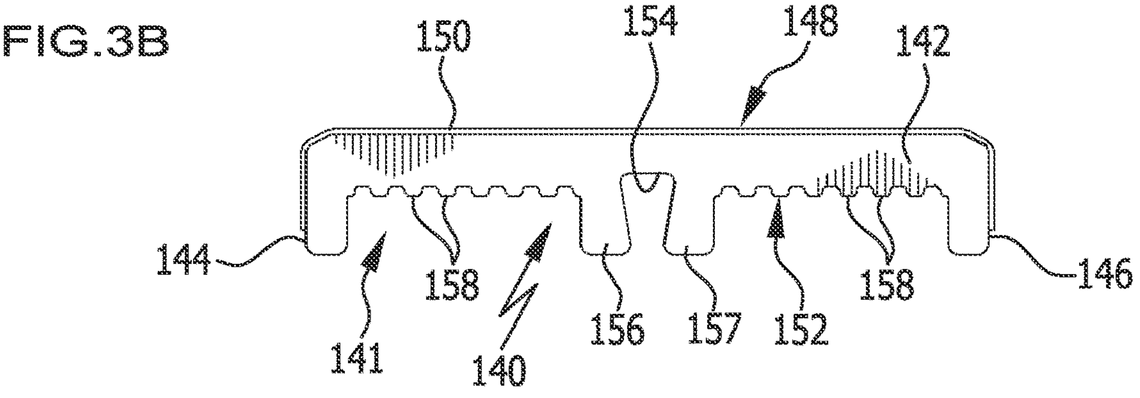

FIG. 3B shows a variant of the spacer 120 in the form of a spacer 140. The spacer 140 has a profiled body 141 having a base body 142 and, laterally delimiting this, lateral walls 144, 146. The lateral walls 144, 146 are oriented parallel to one another and substantially perpendicularly to an outer surface 148 of the spacer 140.

Provided on the outer surface 148 is a vapour barrier layer 150 that extends from the first lateral face of the lateral wall 144, over the outer face of the base body 142 to the second lateral face of the lateral wall 146, and likewise in large part covers the lateral faces.

The substantially planar base body 142 further has an inner face 152 that has, centrally between the lateral walls 144, 146, a groove 154 that runs in the longitudinal direction of the spacer 140 and is delimited by two parallel strip-like projections 156, 157. The spacing between the free ends of the projections 156, 157 is preferably selected to be somewhat smaller than the width of the groove 154 in the region of its root. The groove 154 serves to receive a central, third glass pane (not illustrated) that divides the inner space within an insulating glass unit into two sub-volumes. In the embodiment of the spacer 140 shown, the sub-volumes of the inner space of the insulating glass unit are substantially the same size. As described in the context of FIG. 3A, this may be deviated from where necessary.

In this embodiment, the regions of the inner face 152 between the lateral walls 144 and 146 and the groove 154 and the associated projections 156, 157 are not planar but are provided with ribs 158 that are arranged parallel and at regular intervals.

Figure 3C:
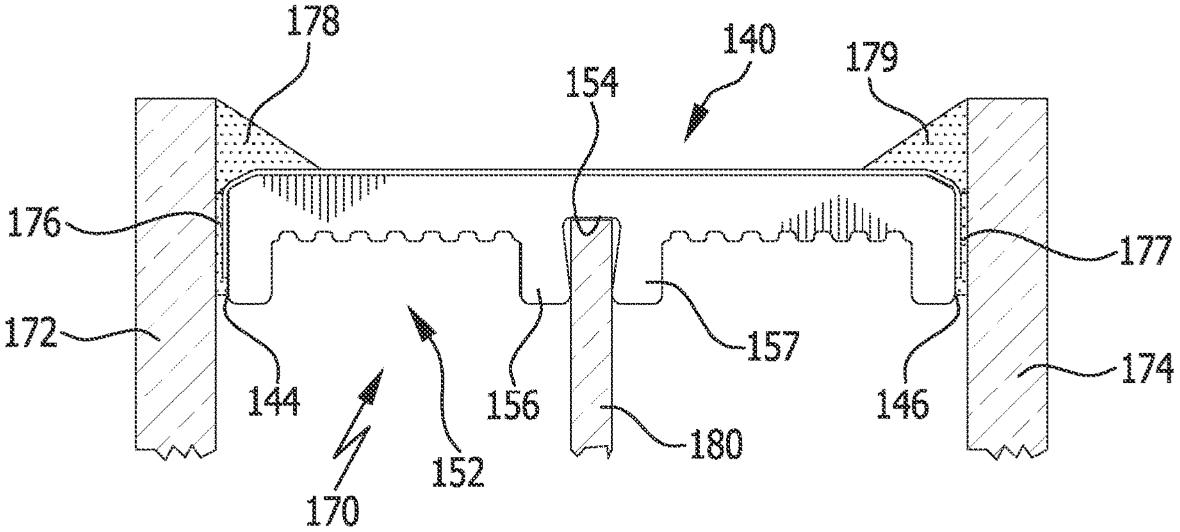

FIG. 3C shows the spacer 140 from FIG. 3B in a situation in which it is installed in an insulating glass unit 170, wherein a first glass pane 172 is arranged abutting against the lateral surface formed by the lateral wall 144 and the vapour barrier layer 150 of the spacer 140, and a second glass pane 174 is arranged abutting against the second lateral surface thereof (corresponding to the lateral face of the lateral wall 146 and the vapour barrier layer 150). The two glass panes 172, 174 are each bonded to the spacer 140 by way of a primary butyl sealant 176, 177. The two glass panes 172, 174 are held in a parallel arrangement at a predetermined spacing from one another by the spacer 140. The upper side of the base body 152 (outer face) in this case forms the outer edge region of the insulating glass unit 170.

The primary butyl sealant 176, 177 is applied to the spacer 140 substantially over the entire height of the lateral faces of the lateral walls 144, 146. A secondary sealant 178, 179 takes the form of a wedge-shaped configuration at each of the outer edge regions of the insulating glass unit 170, as seen in cross section towards the outer glass panes.

A third glass pane 180 is held in the groove 154, between the projections 156, 157, and divides the inner space of the insulating glass unit between the outer glass panes 172, 174 into two sub-volumes. The glass pane 180 may be made from the same material as the glass panes 172, 174 and have the same thickness, but it frequently takes a thinner form, since the glass pane 180 is exposed to smaller loads than the glass panes 172, 174. For this reason, the glass pane 180 can also be made from a different material, such as plexiglass, or indeed by replaced by a plastics film. In each case, the intermediate space between the panes is divided into smaller sub-volumes, with the result that convection currents can be reduced or substantially entirely suppressed. This results in better thermal insulation values in the insulating glass units.

Figure 3D:
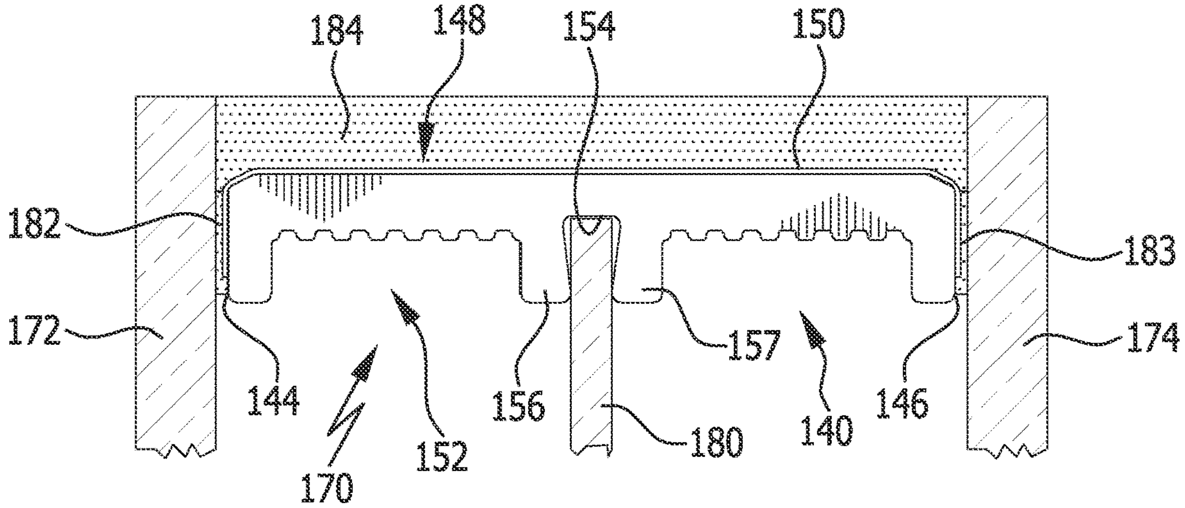

Another situation in which the spacer 140 from FIG. 3B is installed is illustrated in FIG. 3D. In this variant, a primary butyl sealant 182, 183 is applied to the lateral faces of the lateral walls 144 and 146 or to the regions of the vapour barrier layer 150 arranged there. A secondary sealant 184 is applied over the entire face of the outer surface of the spacer 140, with the result that it extends parallel to the outer surface from the one glass pane 172 to the other glass pane 174 and abuts sealingly against both glass panes and against the outer surface (vapour barrier layer 150).

Once again, a third glass pane 180 is inserted and held in the groove 154, between the projections 156, 157, and divides the inner space of the insulating glass unit 170 into two sub-volumes between the outer glass panes 172, 174.

Figure 4A:
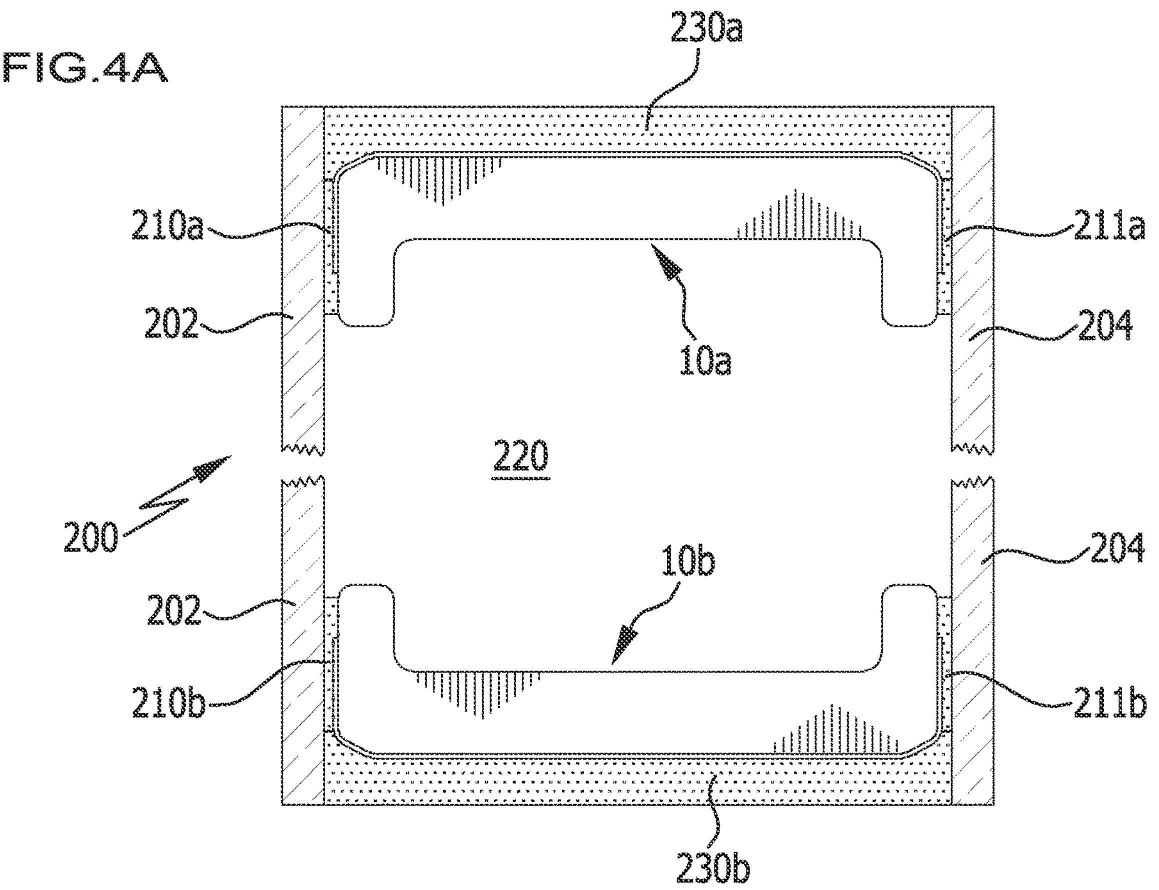
FIGS. 4A and 4B show two variants of an insulating glass unit with spacers according to the invention.
Figure 4B:
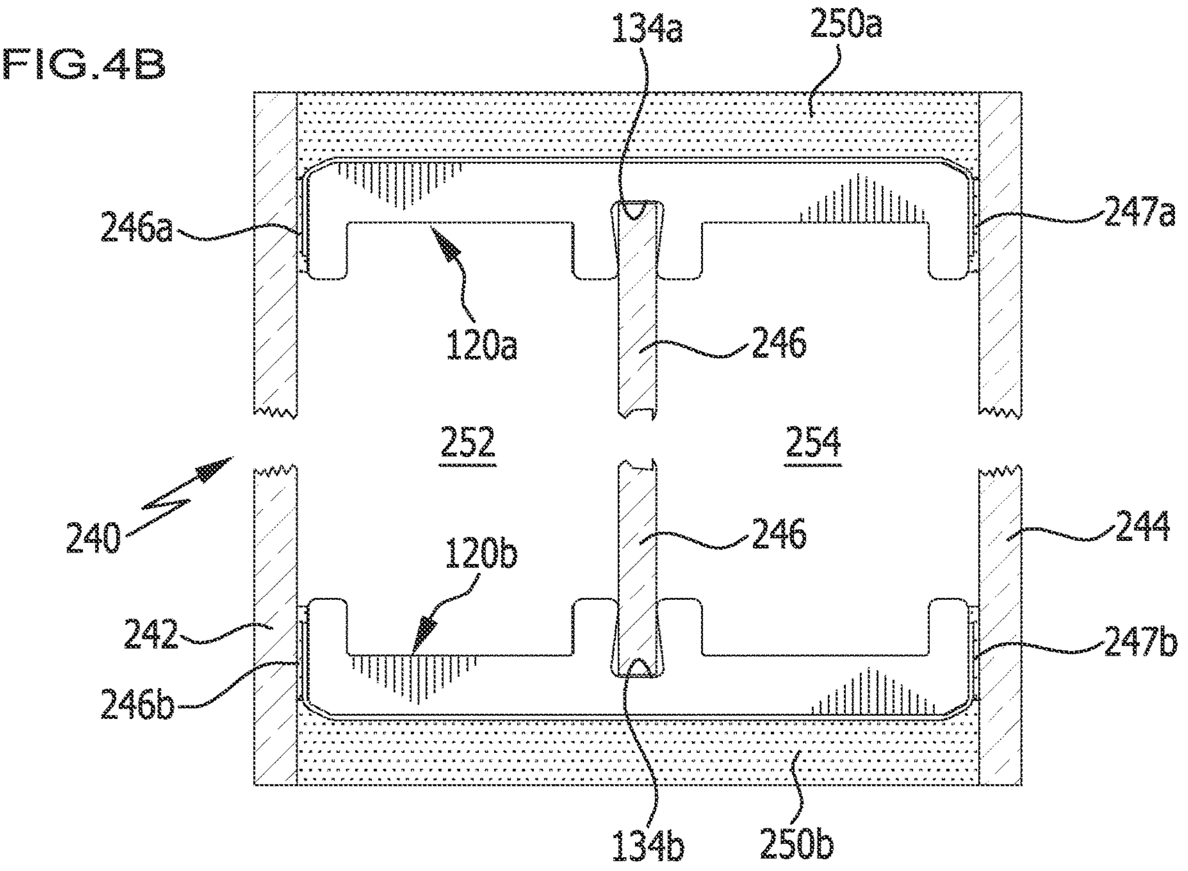

The effect described above of further improving the thermal insulation values of insulating glass units that comprise a third, central glass pane is explained again in detail with reference to FIGS. 4A and 4B. These also make it clear that, as a result of the one-piece spacer for triple glazing, an offset such as can arise between the three glass panes in the case of two conventionally used spacers is avoided.

FIG. 4A shows an insulating glass unit 200 with two parallel glass panes 202, 204 that are held mutually parallel and at a spacing by means of spacer segments 10*a* and 10*b* that correspond to the spacer 10 in FIG. 1A.

The glass panes 202, 204 are bonded to the spacer segments 10*a*, 10*b* by a primary butyl sealant 210*a*, 211*a*, 210*b*, 211*b*. A secondary sealant 230*a*, 230*b* is applied to the entire outer surface of the spacer 10 (in this case the portions 10*a*, 10*b*) in a manner analogous to the embodiment described in connection with FIG. 1C, and also abuts sealingly against the glass panes 202, 204.

The insulating glass unit 200 has a single inner space 220 delimited only by the glass panes 202, 204 and the spacer 10, which is arranged peripherally at the edge region of the glass panes. The spacer segments running in the vertical direction, and the corresponding portions of primary butyl sealant and secondary sealant, are not illustrated in FIG. 4A, for the sake of clarity.

FIG. 4B shows an insulating glass unit 240 having two parallel glass panes 242, 244 that are held mutually parallel and at a spacing by means of spacer segments 120*a* and 120*b* that correspond to the spacer 120 in FIG. 3A.

The glass panes 242, 244 are bonded to the spacer segments 120*a*, 120*b* by a primary butyl sealant 246*a*, 246*b*, 247*a*, 247*b*. A secondary sealant 250*a*, 250*b* is used in a manner analogous to the embodiment described in connection with FIG. 3D.

A third, central glass pane 246 is inserted in the grooves 134*a*, 134*b* of the spacer segments 120*a*, 120*b*, and divides the inner space of the insulating glass unit 240 into two separated sub-volumes 252, 254.

The divided inner space of the insulating glass unit 240 has sub-volumes 252, 254 and is outwardly delimited only by the glass panes 242, 244, the spacer 120, which is arranged peripherally at the edge region of these glass panes, and the primary (butyl) sealant 246*a*, 246*b*, 247*a*, 247*b* and the secondary sealant 250*a*, 250*b*. The spacer segments running in the vertical direction, and the corresponding portions of butyl adhesive and secondary sealant, are not illustrated in FIG. 4A, for the sake of clarity.

Figure 5A:
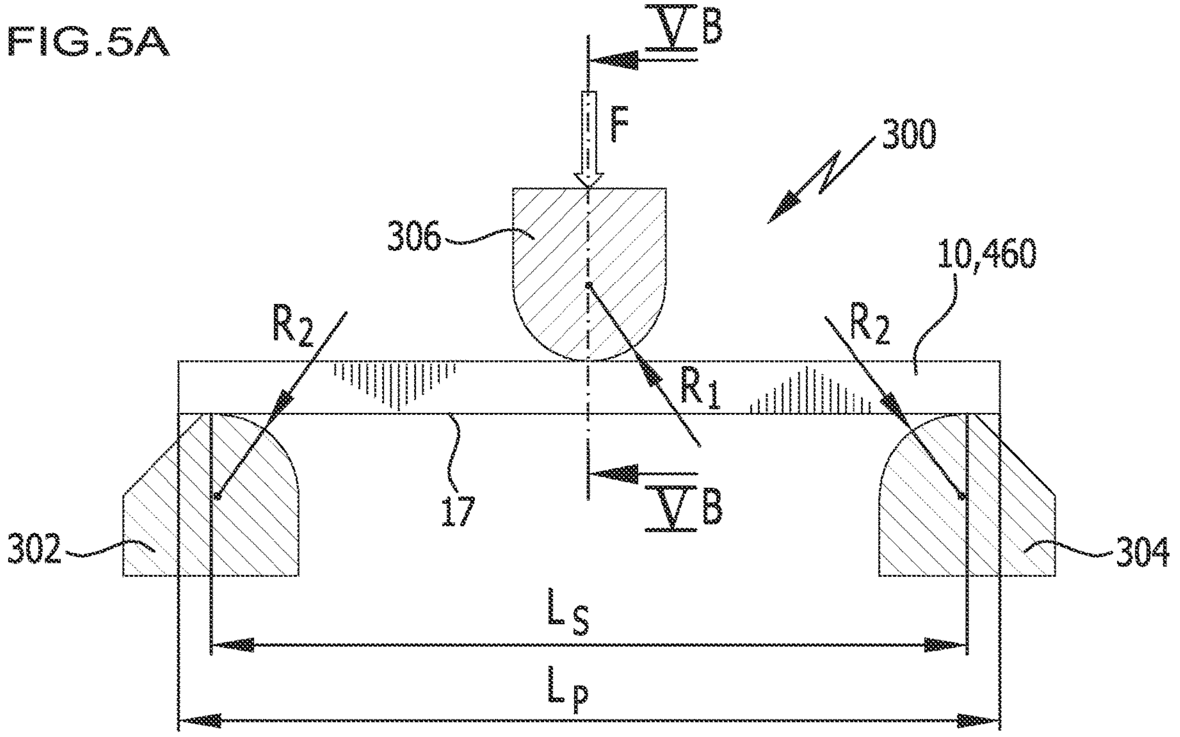
FIGS. 5A to 5D show a schematic test set-up for determining the deflection of spacers according to the invention perpendicular to their outer surface.

FIG. 5A shows schematically a test arrangement 300 for determining the deflection of a spacer according to the invention (in this case, by way of example, the spacer 10) or indeed the flexural strength in conformance with DIN EN ISO 178 (2013). The specimen of the spacer 10 that is used for the test has a length $L_P$ of 150 mm and is positioned on two supporting bodies 302, 304, wherein the support points maintain a predetermined spacing $L_S$ of 100 mm from one another, also called the loading span below. The two supporting bodies 302, 304 define a support plane.

Positioned centrally in relation to the loading span $L_S$ is a partly cylindrical die 306 having a planar contour by means of which a force F can be introduced to the spacer, perpendicularly to the support plane.

For the coilability or rollability of the spacer according to the invention, the deflection relative to an unloaded condition is important, and this is measured at the outer surface of the spacer for measuring in each case (here for example the outer surface 17 of the spacer 10), with the force introduced by the die 306 being 50 N.

Figure 5B:
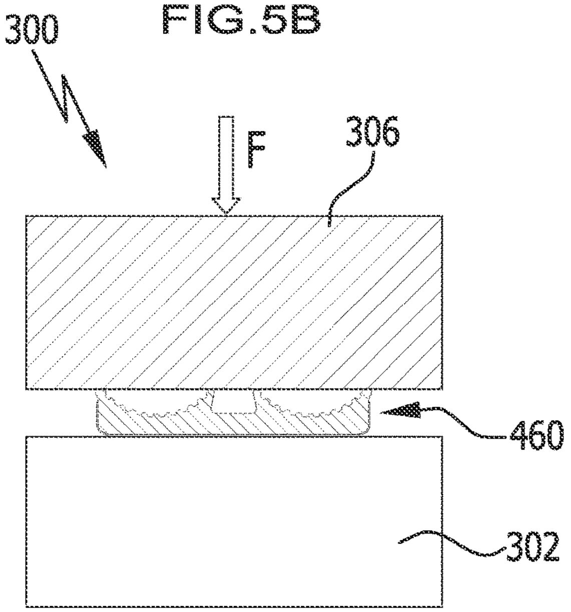

In FIG. 5B, the test arrangement 300 is shown with a spacer 460, in a sectional illustration along the line VB-VB, perpendicular to the longitudinal direction of the spacer 460 and parallel to the direction of the active force F.

Figure 5C:
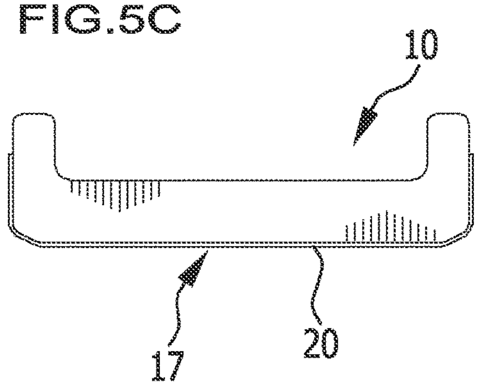
Figure 5D:
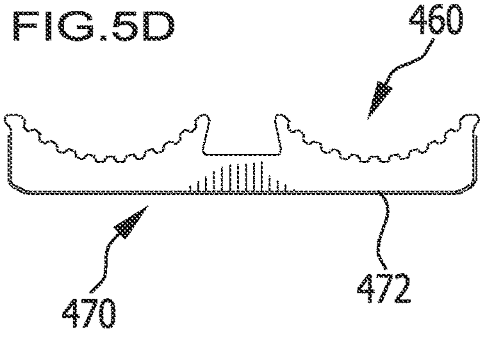

In part-FIGS. 5C and 5D, the two spacers 10 and 460 are shown in an orientation in which the respective outer surface 17 or 470, which lies on the supporting bodies 302, 304 during the test for deflection, faces downwards.

Preferably, the spacer according to the invention has a coilability such that, with a force of 50 N acting in the centre of the loading span, there is a deflection of approximately 1 mm or more, preferably approximately 1.3 mm or more, more preferably approximately 1.7 mm or more by comparison with an unloaded condition. The deflection is measured at the outer surface 17 and 470 (in this case at the barrier layer 20 and 472 respectively) of the spacer, in the centre of the loading span, as the spacer lies on the two supporting bodies 302, 304 at a loading span of 100 mm, as measured in the longitudinal direction of the spacer. The force of 50 N is introduced into the spacer perpendicularly to a support plane defined by the supporting bodies (and also perpendicularly to the outer surface) (test method A; cf. FIGS. 5A and 5B).

Figure 6A:
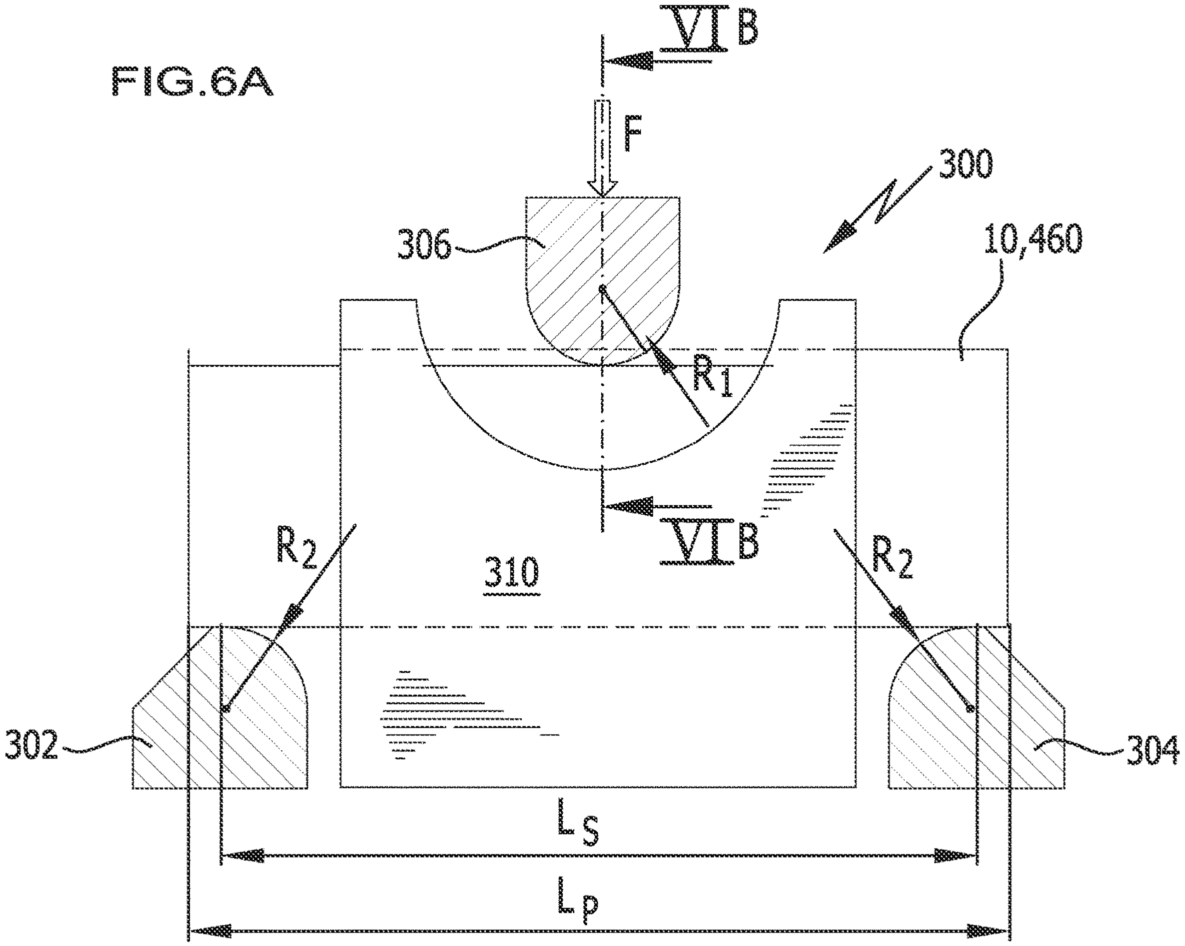
FIGS. 6A to 6D show a schematic test set-up for determining the deflection of spacers according to the invention perpendicular to a lateral surface.
Figure 6B:
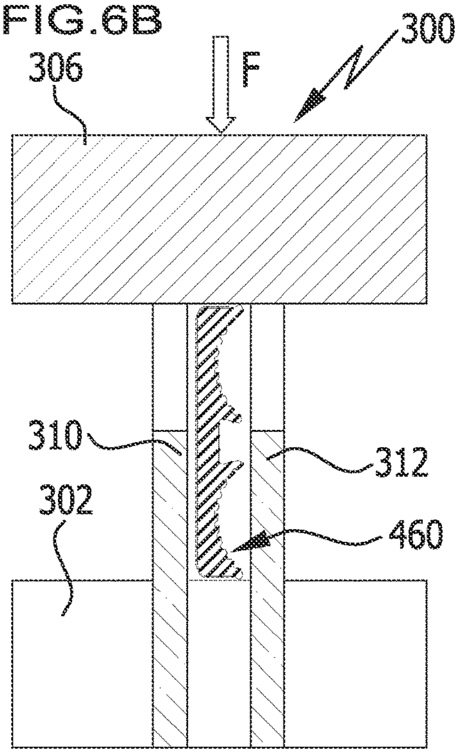

For handling of the spacers according to the invention during manufacture of the insulating glass units, it is preferable if the spacers have a flexural strength, under a force introduced perpendicularly to a lateral face (in this case 14; 468) or lateral surface, at which deflection of the spacer (10; 460) in a position according to FIGS. 6A and 6B under a force of 100 N acting in the centre of the loading span $L_S$ is approximately 10 mm or less, preferably approximately 5 mm or less, more preferably approximately 3 mm or less, relative to an unloaded condition.

Figure 6C:
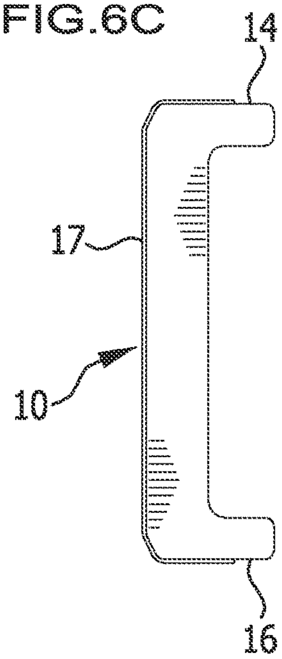
Figure 6D:
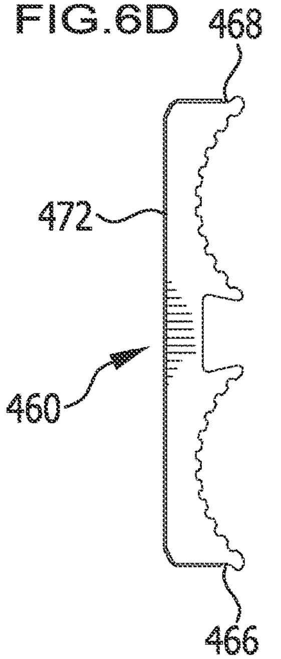

The deflection is determined at one of the lateral surfaces (in this case 14, 16; 466, 468) of the spacer, centrally in relation to the loading span, as the lateral surface lies on the two supporting bodies 302, 304 of the test arrangement 300 with a loading span $L_S$ of 100 mm, as measured in the longitudinal direction of the spacer. The typical specimen length $L_P$ is 150 mm. The force of 100 N is introduced into the spacer perpendicularly to the lateral surfaces (test method B). This test requires an orientation of the spacers in the manner illustrated for the spacers 10 and 460 in detail FIGS. 6C and 6D. For correct performance of the test, the spacer can be held in the orientation shown in detail FIGS. 6A and 6B by guide elements 310, 312 without this having a noticeable influence on the measurement results. The guide elements 310, 312 can be held in position, parallel and at a predetermined spacing from one another, such that the spacer 10, 460 can be received between them with little play.

As mentioned above, a loading span or support distance $L_S$ of 100 mm and a length of the specimen body $L_P$ of approximately 150 mm are used as the test parameters when measuring the flexural strength in conformance with DIN EN ISO 178. The other test parameters are as follows:

Initial load: 1 N (test method variants A and B)

Test speed: 10 mm/min (test method variants A and B)

Radii R1 (die 306) and R2 (supporting bodies 302, 304): 5 mm Once the spacer to be tested has been put in position on the supporting bodies 302, 304, the die 306 is brought into contact with the spacer 10, 460 under the initial load, and this stabilises the spacer 10, 460 in position. Then the test die 306 is moved perpendicularly downwards at the predetermined test speed, wherein the force then acting on the specimen body (spacer) is recorded as a function of the travel performed by the test die 306 (cf. FIGS. 8A to 8C). This distance corresponds substantially to the deflection of the specimen body.

The spacer profiles are laid with the outer surface oriented downwards (test method A—for deflection perpendicular to the outer surface; FIG. 5A/5B) and with the outer surface oriented to the side (test method B—for deflection or flexural strength perpendicular to the lateral face; FIG. 6A/6B).

With the test method variant A, the outer surface is defined as the side that, when the spacer is in the condition installed in an insulating glass unit, is arranged adjacent to the outer periphery of the insulating glass unit. When the three-point bend test is performed, the die 306 of the test arrangement 300, also called the compression die, presses perpendicularly downwards from above against the specimen (in this case spacer 10 or 460) at $L_S/2$.

With the test method variant B (deflection perpendicular to the lateral surface), if the spacer undergoes pronounced distortion and deviates to a great extent from the desired orientation during measurement, then a suitable guide must be used to keep the specimen body in the perpendicularly upright orientation. The guide may be a or if necessary two separate loosely abutting guide plates, as described above, which limit lateral deviation of the specimen bodies but allow perpendicular movement of the specimen body substantially unimpeded, in particular as it is pushed in by the compression die. This is illustrated in FIGS. 6A and 6B, and reference may be made here to the description thereof.

The specimen bodies must be free of visible damage (e.g. irreversible deformation, cracks, ruptures, etc.) and represent a conventional good product condition that also meets the quality requirements for mounting in insulating glass units. The values obtained in the test methods A and B are substantially independent of any moisture absorption by the desiccant that occurs before the test methods are performed.

The width B of the spacers according to the invention is preferably approximately 12 mm to approximately 44 mm, more preferably approximately 14 mm to approximately 40 mm.

There is no need to condition the specimen bodies before measurement. The specimen bodies are preferably tested in a standard atmosphere of 23° C.±2° C. at 50%±10% air humidity.

Measurement ends in the event of rupture or destruction of the specimen body, or when the maximum travel of the die 306 is reached.

The measurements are performed such that the deflection path is recorded and stored, and can be output as a force-displacement curve.

The test methods A and B are carried out on specimens according to the invention and specimens from the prior art.

More detailed characterisation of the specimens can be seen in Table 1 below. There is a schematic overview of the profile geometries in FIG. 7 (detail FIGS. 7*a* to 7*i*).

Specimen a) corresponds to an exemplary embodiment of the present invention with the following properties:

The spacer is formed as a solid profile of polypropylene with 20 weight % of glass fibres (GF 20) and 40 weight % of desiccant (3A zeolite powder; average particle size approximately 6 to 9 μm; available from Grace GmbH & Co KG under the name Sylosiv K300), in each case relative to the total weight of the spacer. The geometry also corresponds to the spacer 460 of FIG. 9C. As the barrier layer there was used a stainless steel foil 10 μm thick. The spacer is coilable/rollable onto a core having a diameter of 300 mm. The spacer is intended for triple glazing with two intermediate spaces between the panes, each of 12 mm, and a central pane 4 mm thick.

Specimen b) corresponds to an exemplary embodiment of the present invention with the following properties:

The spacer is formed as a solid profile of polypropylene with 10 weight % of glass fibres (GF 10) and 40 weight % of desiccant (3A zeolite powder; average particle size approximately 6 to 9 μm; available from Grace GmbH & Co KG under the name Sylosiv K300), in each case relative to the total weight of the spacer. The geometry also corresponds to the spacer 10 of FIG. 1A. As the barrier layer there was used a stainless steel foil 10 μm thick. The spacer is coilable/rollable onto a core having a diameter of 300 mm.

Specimen c) is a conventional spacer, available from Rolltech A/S under the name Chromatech® Ultra F2. The spacer is made from polypropylene and has on its outer surface a stainless steel strip approximately 0.1 mm thick as the barrier layer. The spacer takes the form of a hollow profile and is not rollable. Desiccant can be put into the hollow chamber within the hollow profile.

Specimen d) is a conventional spacer, available from Rolltech A/S under the name Multitech®. The spacer is made from a plastics hollow profile of styrene acrylonitrile polymer (SAN) with approximately 35 weight % of glass fibres (GF 35), relative to the total weight of the spacer, wherein there is applied to the outer surface of the spacer profile a metallised foil as the barrier layer. Desiccant can be put into the hollow chamber within the hollow profile. The spacer is not rollable.

Specimen e) is a conventional spacer for triple insulating glass units that is available from SWISSPACER Vetrotech Saint-Gobain (International) AG under the name SWISSPACER TRIPLE. The two intermediate spaces between the panes are each 16 mm in size. The thickness of the central pane is 2 mm. The spacer is likewise made from a plastics hollow profile with two hollow chambers made from SAN with approximately 35 weight % of glass fibres (GF 35), relative to the total weight of the spacer, and a metallised plastics foil as the barrier layer. Desiccant can be put into the hollow chambers within the hollow profile. The spacer is not rollable.

Specimen f) is a conventional spacer, available from Thermoseal Group under the name Thermobar®. The spacer is made from a plastics hollow profile of polypropylene with approximately 40 weight % of glass fibres (GF 40), relative to the total weight of the spacer, onto the outer surface of which a metallised foil is applied as the barrier layer. Desiccant can be put into the hollow chamber within the hollow profile. The spacer is not rollable.

Specimen g) is a conventional rollable spacer, available from Edgetech under the name Super Spacer® Premium. The spacer is formed as a solid profile and made from an expanded silicone material in which a desiccant (approximately 47 weight %) is embedded. Applied to the outer surface of the solid profile is a metallised foil as the barrier layer.

Specimen h) is a conventional rollable spacer based on polyurethane, available from Glasslam under the name WorldSpacer™. The spacer is formed as a solid profile and is made from an expanded polyurethane material in which a desiccant (approximately 45 weight %) is embedded. Applied to the outer surface of the solid profile is a stainless steel strip approximately 50 μm thick as the barrier layer.

Specimen i) is a conventional rollable spacer, available from the Soytas Group under the name Panaspacer. The spacer comprises a corrugated reinforcing element made from polycarbonate, which takes up the majority of the cross sectional surface. This reinforcing element is covered laterally and to the inside by a barrier layer. On the inside, above the barrier layer, is additionally a foam material in which desiccant is embedded. The manufacturer does not specify the proportion of desiccant.

Table 1 also shows the values of the Shore hardness D of the specimens according to the invention and the rollable specimens from the prior art, where these are available, for comparison.

Figure 9A:
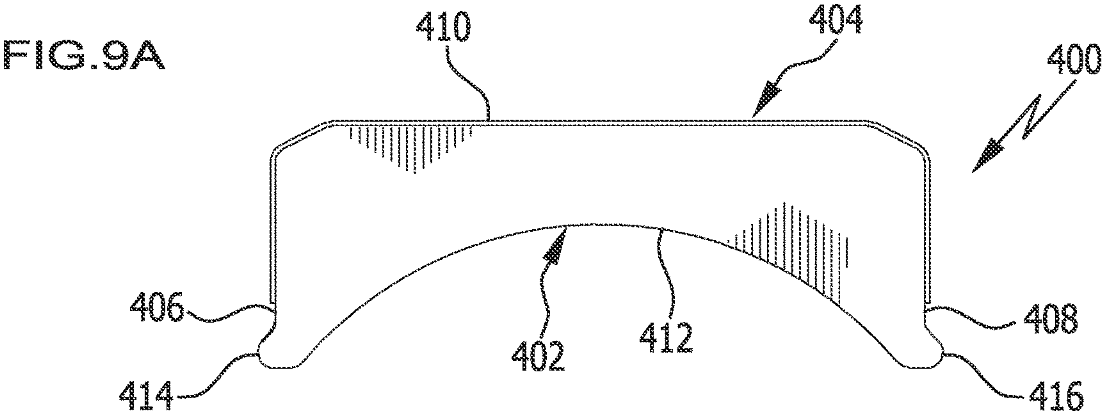
FIGS. 9A to 9E show further embodiments of the spacer according to the invention and variants thereof, some in different installation situations in an insulating glass unit.
Figure 9B:
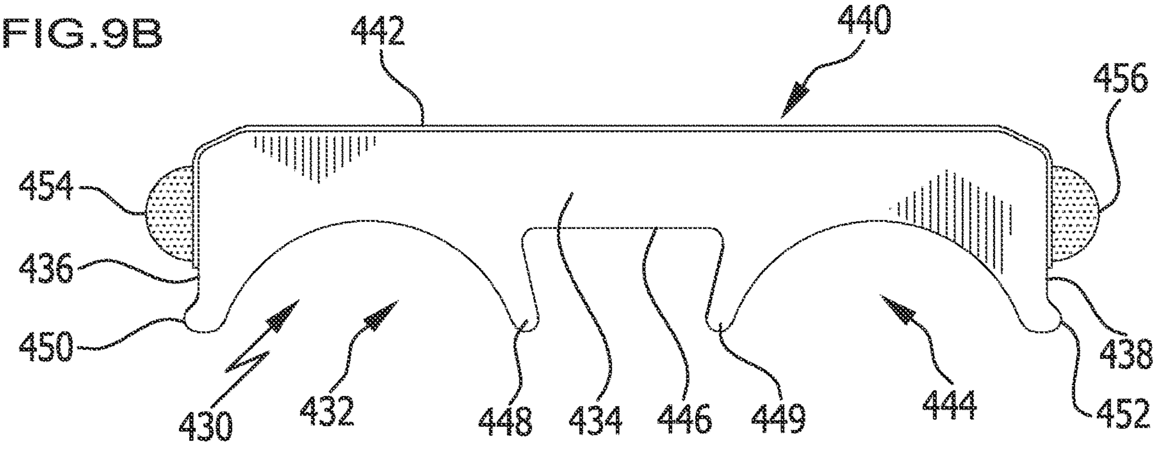

A further embodiment of a spacer 430 according to the invention is shown in FIG. 9B, wherein the spacer 430 once again has a profiled body 432 with a base body 434 and lateral faces 436, 438 that are laterally adjacent thereto. The lateral faces 436, 438 are oriented mutually parallel and substantially perpendicular to a planar outer surface 440.

TABLE 1

Figure 7A:
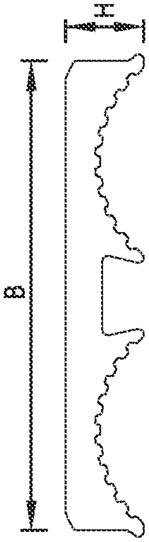
FIGS. 7*a* to 7*i* show schematic profile geometries of the spacer profiles a) to i) in Table 1.
Figure 7B:
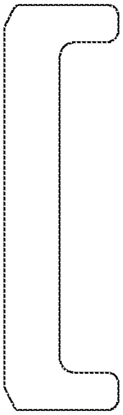
Figure 7C:
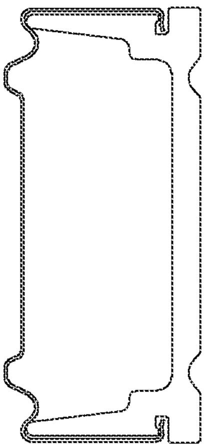
Figure 7D:
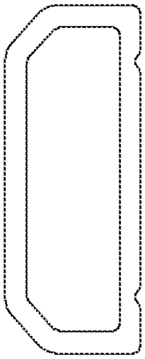
Figure 7E:
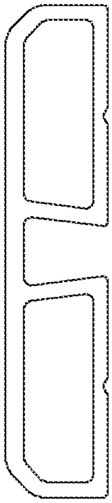
Figure 7F:
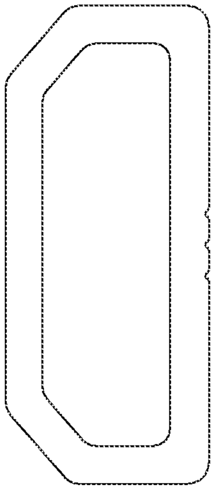
Figure 7G:
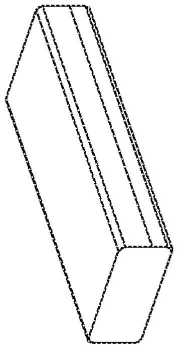
Figure 7H:
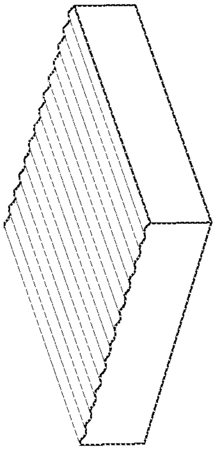
Figure 7I:
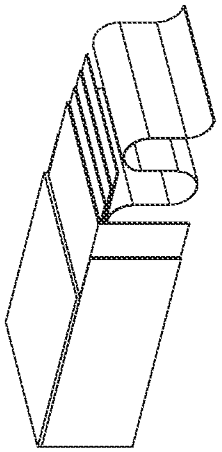

| | Specimen | Intermediate space between panes [mm] | Cross section (schematic) | Width B × height H [mm] × [mm] | Weight per metre [g/m] | Desiccant content [wt. %] | Shore hardness D | Polymer material |
|---|---|---|---|---|---|---|---|---|
| a) | Inventive profile | 2 × 12 + central pane of 4 mm | FIG. 7a | 27 × 4.5 | 92.5 | 40 | approx. 80 | PP GF 20 |
| b) | Inventive profile | 16 | FIG. 7b | 16 × 4.5 | 50.5 | 40 | approx. 77 | PP GF 10 |
| c) | Chromatech Ultra F2 | 16 | FIG. 7c | 15.5 × 6.9 | 59.1 | 0 | — | PP |
| d) | Multitech | 16 | FIG. 7d | 15.5 × 6.5 | 45.5 | 0 | — | SAN GF 35 |
| e) | Swisspacer Triple | 2 × 16 + central pane of 2 mm | FIG. 7e | 33 × 6.7 | 98.3 | 0 | — | SAN GF 35 |
| f) | Thermobar | 16 | FIG. 7f | 15.5 × 6.5 | 44.9 | 0 | — | PP GF 40 |
| g) | Super Spacer Premium | 16 | FIG. 7g | 16.0 × 4.8 | 78 | 47 | approx. 10 | expanded silicone |
| h) | Worldspacer | 20 | FIG. 7h | 19.3 × 5.6 | 152.4 | 45 | approx. 18 | expanded PU |
| i) | Panaspacer | 14 | FIG. 7i | 14.0 × 7.1 | 69.5 g | ? | approx. 17 | polycarbonate |

Figure 8A:
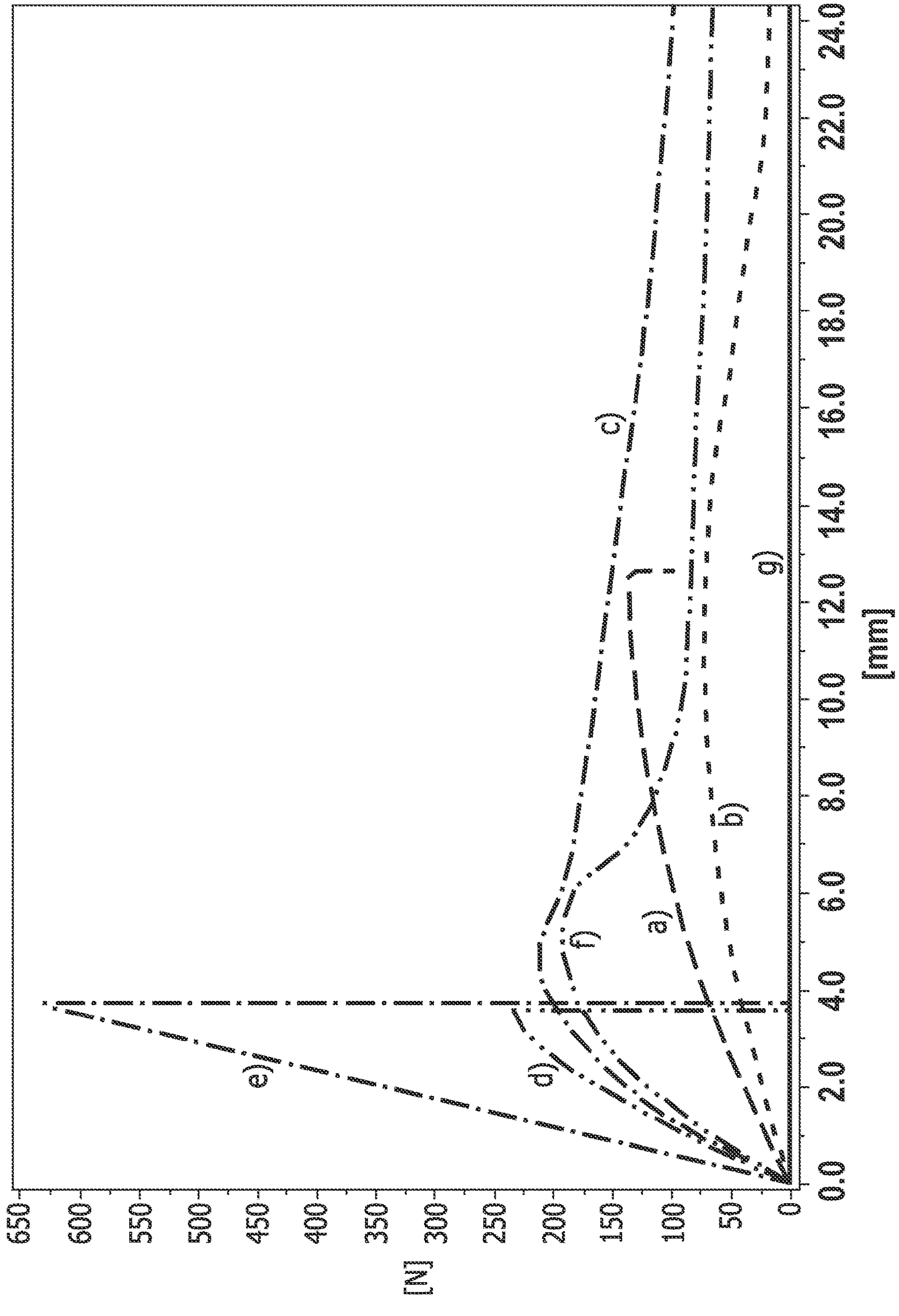
FIGS. 8A to 8C show measurement curves obtained with different types of spacers using a test set-up according to FIG. 5 and FIG. 6.
Figure 8B:
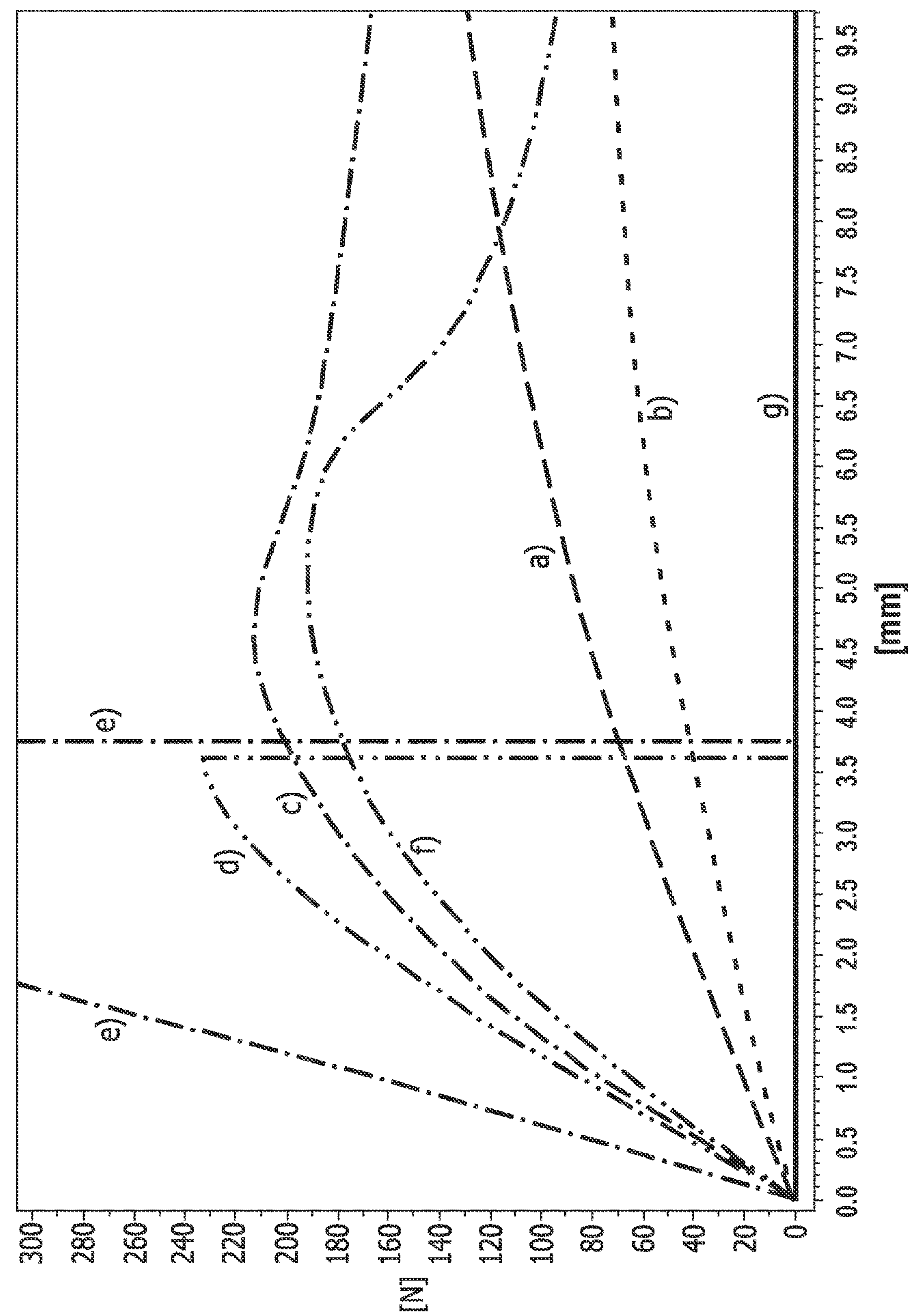

FIGS. 8A and 8B show the measurement results in the form of such force-displacement curves, for a selection of spacers a) and b) according to the present invention and c) to g) according to the prior art, measured in accordance with the test method variant A. The measurement curves for the specimens h) and i) are not shown, since their course corresponds substantially to the course of the curve of the specimen g), that is to say of a conventional rollable specimen.

Figure 8C:
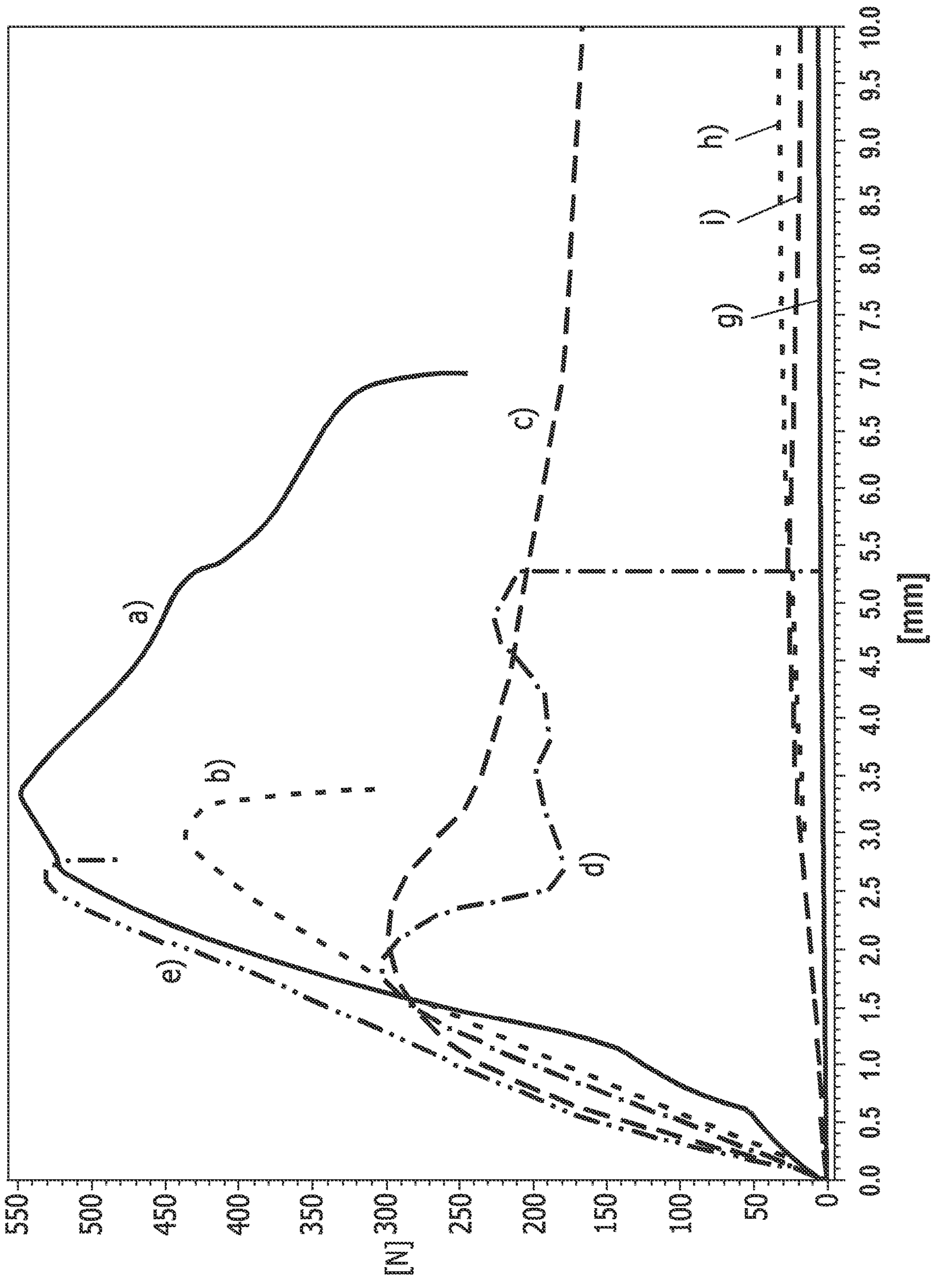

FIG. 8C shows the measurement results in the form of force-displacement curves for the specimens a) and b) according to the invention and, according to the prior art, c) to e) and g) to i), wherein the conventional specimens g) to i) are rollable specimens. Here, measurement was in accordance with the test method variant B. The measurement curve for the specimen f) is not shown in FIG. 8C, since it coincides substantially with the curve of the specimen d).

FIG. 9A shows a further embodiment of a spacer 400 according to the invention, with a profiled body 402 that has a base body with a planar outer face 404 and parallel lateral faces 406 and 408 that are oriented perpendicularly to the outer face 404. Arranged on the outer face 404 is a vapour barrier layer 410 that extends from the first lateral face 406, over the outer surface 404 to the second lateral face 408, and forms the great majority of the lateral surfaces of the spacer. The inner face 412 of the base body (inner surface of the spacer), on the opposite side to the planar outer face 404, is concave in form and extends substantially from the first lateral face 406 to the second lateral face 408.

The ends of the lateral faces 406, 408 that are adjacent to the inner surface 412 have respectively outwardly protruding bead-like projections 414, 416 that, in the condition in which the spacer is installed in an insulating glass unit, abut directly against the glass panes and hold the lateral faces 406, 408, including the lateral surfaces formed by the vapour barrier layer 410, at a small spacing from the respective glass pane and thus create a defined space for receiving butyl adhesive compound. Further, in this way it is possible to prevent butyl adhesive compound from entering the inner space within the insulating glass unit and being visible there.

Provided on the outer surface 440 is a vapour barrier layer 442 that extends from the first lateral face 436, over the outer surface 440 to the second lateral face 438 and, likewise, in large part covers the lateral faces 436, 438 and thus forms a large part of the lateral surfaces of the spacer 430.

Further, the base body 434 has an inner face 444 that has, centrally between the lateral faces 436, 438, a groove 446 that runs in the longitudinal direction of the spacer 430 and is delimited by two parallel projections 448, 449. The spacing between the free ends of the projections 448, 449 is preferably selected to be somewhat smaller than the width of the groove 446 in the region of its root. The groove 446 serves to receive a central, third glass pane (not illustrated) that divides the inner space of an insulating glass unit into two sub-volumes.

The inner face 444 (inner surface of the spacer 430) takes a concave form respectively in the regions between the lateral face 436 and the projection 448, and the lateral face 438 and the projection 449.

The ends of the lateral faces 436, 438 that are adjacent to the inner face 444 have respectively outwardly protruding bead-like projections 450, 452 that, in the condition in which the spacer is installed in an insulating glass unit, abut directly against the glass panes and hold the lateral faces 436, 438 at a small spacing from the respective glass pane and thus create a defined space for receiving butyl adhesive compound. Further, in this way it is possible to prevent butyl adhesive compound from entering the inner space within the insulating glass unit and being visible there.

Further, in the exemplary embodiment shown in FIG. 9B, there is applied to each of the lateral surfaces (in this case on the surface portions of the vapour barrier layer 442 that cover the lateral faces 436, 438) a volume 454, 456 of primary sealant (butyl adhesive compound) that is sufficient to ensure sealing and bonding between the glass pane to be supplied and the lateral surfaces of the spacer 430. Here, the primary sealant 454, 456 is illustrated in the uncompressed condition.

Figure 9C:
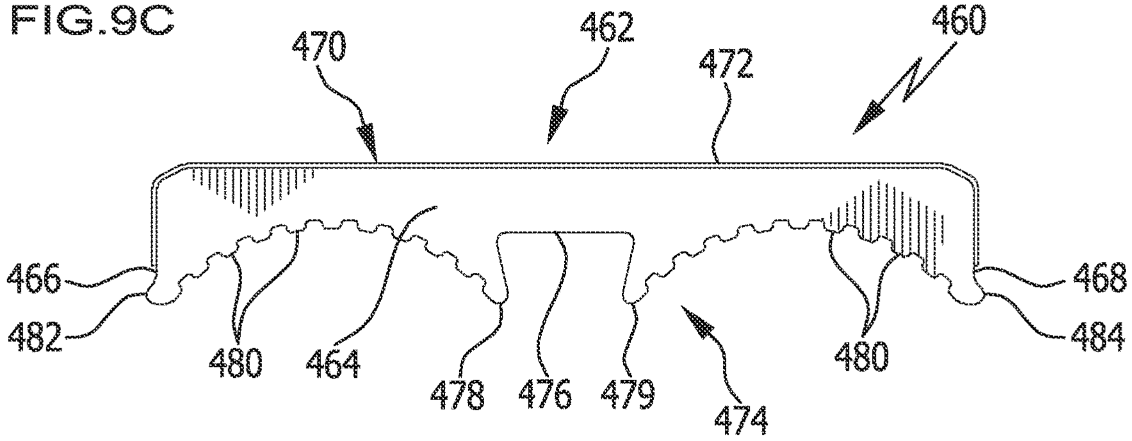

FIG. 9C shows a variant of the spacer 430 according to the invention from FIG. 9B.

The spacer 460 according to the invention in accordance with FIG. 9C has a profiled body 462 with a base body 464 and lateral faces 466, 468 that laterally delimit it. The lateral faces 466, 468 are oriented mutually parallel and substantially perpendicular to a planar outer surface 470.

Provided on the outer surface 470 of the spacer 460 is a vapour barrier layer 472 that extends from the first lateral face 466, over the outer surface 470 to the second lateral face 468 and, likewise, in large part covers the lateral faces 466, 468.

Further, the base body 464 has an inner face 474 that has, centrally between the lateral faces 466, 468, a groove 476 that runs in the longitudinal direction of the spacer 460 and is delimited by two parallel projections 478, 479. The spacing between the free ends of the projections 478, 479 is preferably selected to be somewhat smaller than the width of the groove 476 in the region of its root. The groove 476 serves to receive a central, third glass pane (not illustrated) that divides the inner space of an insulating glass unit into two sub-volumes.

The inner face 474 takes a concave form respectively in the regions between the lateral face 466 and the projection 478, and between the lateral face 468 and the projection 479, and is provided with ribs 480 that run mutually parallel and are spaced at regular intervals in the longitudinal direction of the spacer 460.

The ends of the lateral faces 466, 468 that are adjacent to the inner face 474 have respectively outwardly protruding bead-like projections 482, 484 that, in the condition in which the spacer 460 is installed in an insulating glass unit, abut directly against the glass panes and hold the lateral faces 466, 468 at a small spacing from the respective glass pane and thus create a defined space for receiving butyl adhesive compound. Further, in this way it is possible to prevent butyl adhesive compound from entering the inner space within the insulating glass unit and being visible there.

Figure 9D:
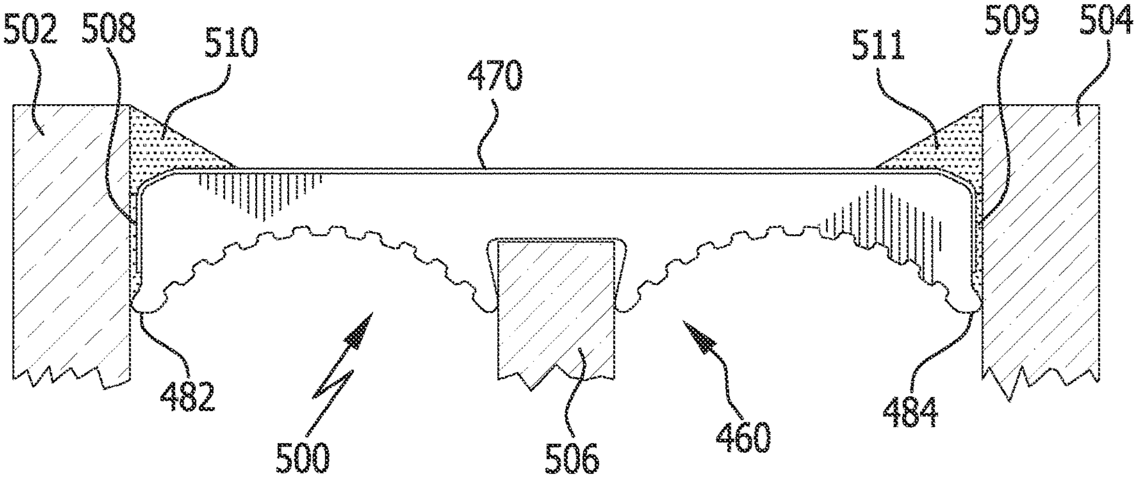
Figure 9E:
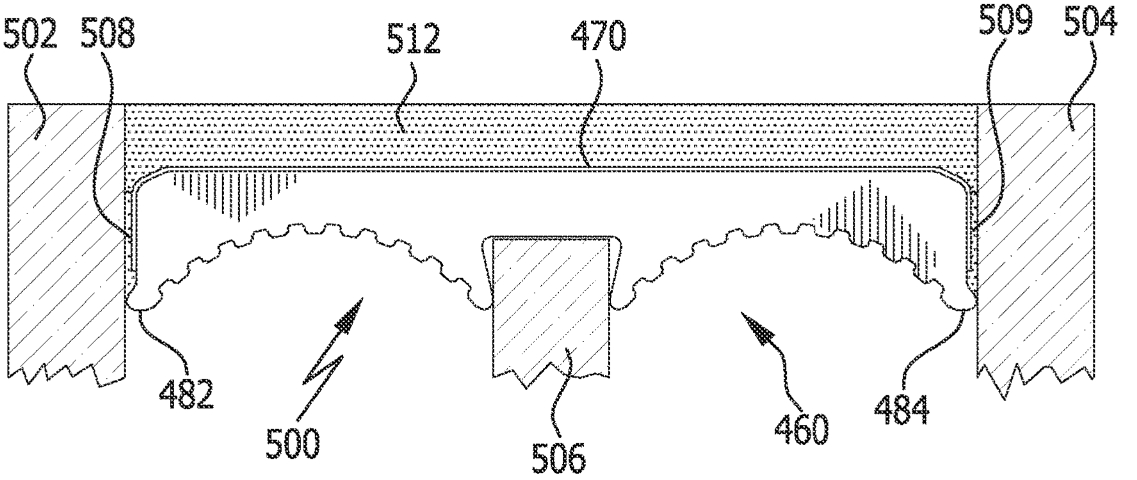

FIGS. 9D and 9E show the spacer 460 incorporated into a triple insulating glass unit 500 with two glass panes 502, 504, which are arranged on the outside, to either side of the spacer 460, against its lateral surfaces (lateral faces 466 and 468), and a central glass pane 506 that is inserted in the groove 476. The glass panes 502, 504 are bonded to the spacer 460 by a compressed primary butyl sealant 508, 509 that extends substantially over the entire lateral faces 466 and 468. Adjoining the compound of butyl sealant, a secondary sealant 510, 511 is applied in a wedge-shaped cross section at the outer edge of the respective glass pane 502 and 504 and portions of the outer surface 470 (FIG. 9D), or it extends as a continuous layer 512 at a substantially constant thickness over the entire outer surface 470 (FIG. 9E). The bead-like projections 482, 484 delimit the volumes of primary butyl adhesive in the direction of the inner space of the insulating glass unit 500.

As a result of the wedge-shaped application of the secondary sealant 510, 511 in FIG. 9D, by comparison with the conventionally used continuous application of the secondary sealant 512 in FIG. 9E, it is possible to save on a considerable quantity of secondary sealant. Moreover, thermal conduction in this region is reduced, so the Psi values for the edge bond are smaller.

The glass panes 502, 504 in FIG. 9E are, once again, bonded to the lateral faces of the spacer 460 by a primary sealant 508, 509.

Figure 10:
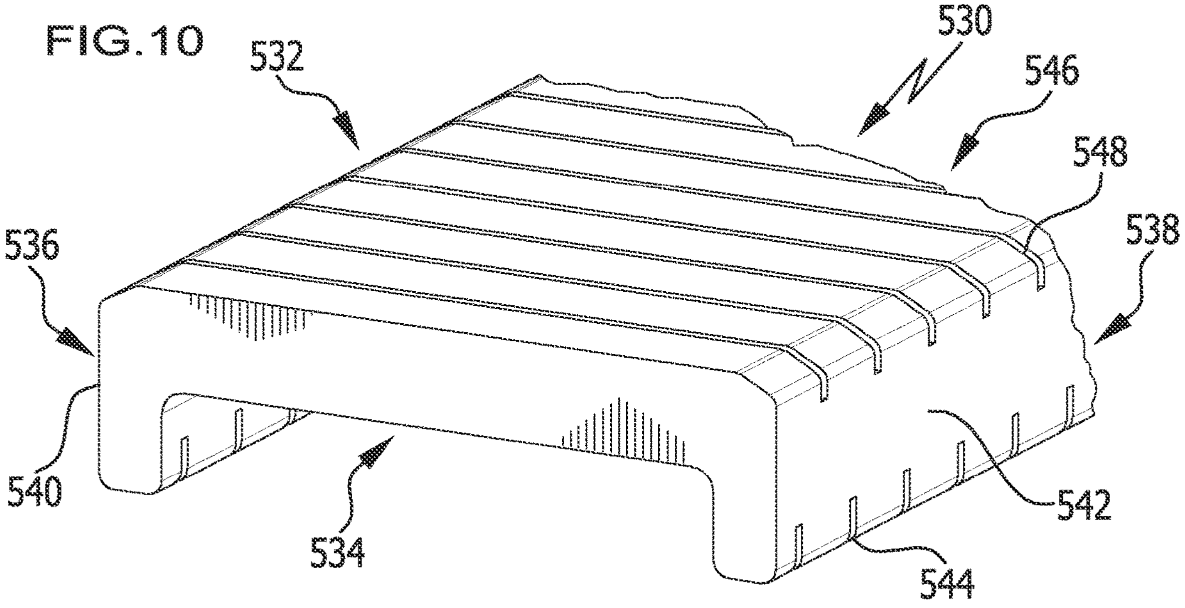
FIG. 10 shows a further embodiment of a spacer according to the invention.

FIG. 10 shows a further embodiment of a spacer 530 according to the invention, which has a profiled body 532 with a substantially planar base body 534 adjoined on either side by lateral walls 536, 538 having lateral faces 540, 542.

Slots 544 are introduced in the free ends of the lateral walls 536, 538 at regular intervals, perpendicularly to the longitudinal direction of the spacer 530. Likewise, at regular intervals in the outer face 546 of the base body 534 there are introduced slots 548, which extend perpendicularly to the longitudinal direction over the entire width of the base body 534.

As seen in the longitudinal direction of the spacer 530, the slots 544 and 548 are either arranged offset from one another, as illustrated, or else are in an identical position in the longitudinal direction (not shown). This formation of a spacer according to the invention allows the use of comparatively rigid plastics materials and where appropriate comparatively high contents of desiccant in the plastics material for formation of the profiled body, with the rollability of the spacer nonetheless being retained. Moreover, as a result of an appropriate configuration of these slots, the plastic deformations and restoring forces that may result from coiling can be reduced to such an extent that, simply by being bonded with primary sealant, the spacer remains in the desired position in relation to the glass panes until the secondary sealant, which is applied afterwards, has cured.

Figure 11:
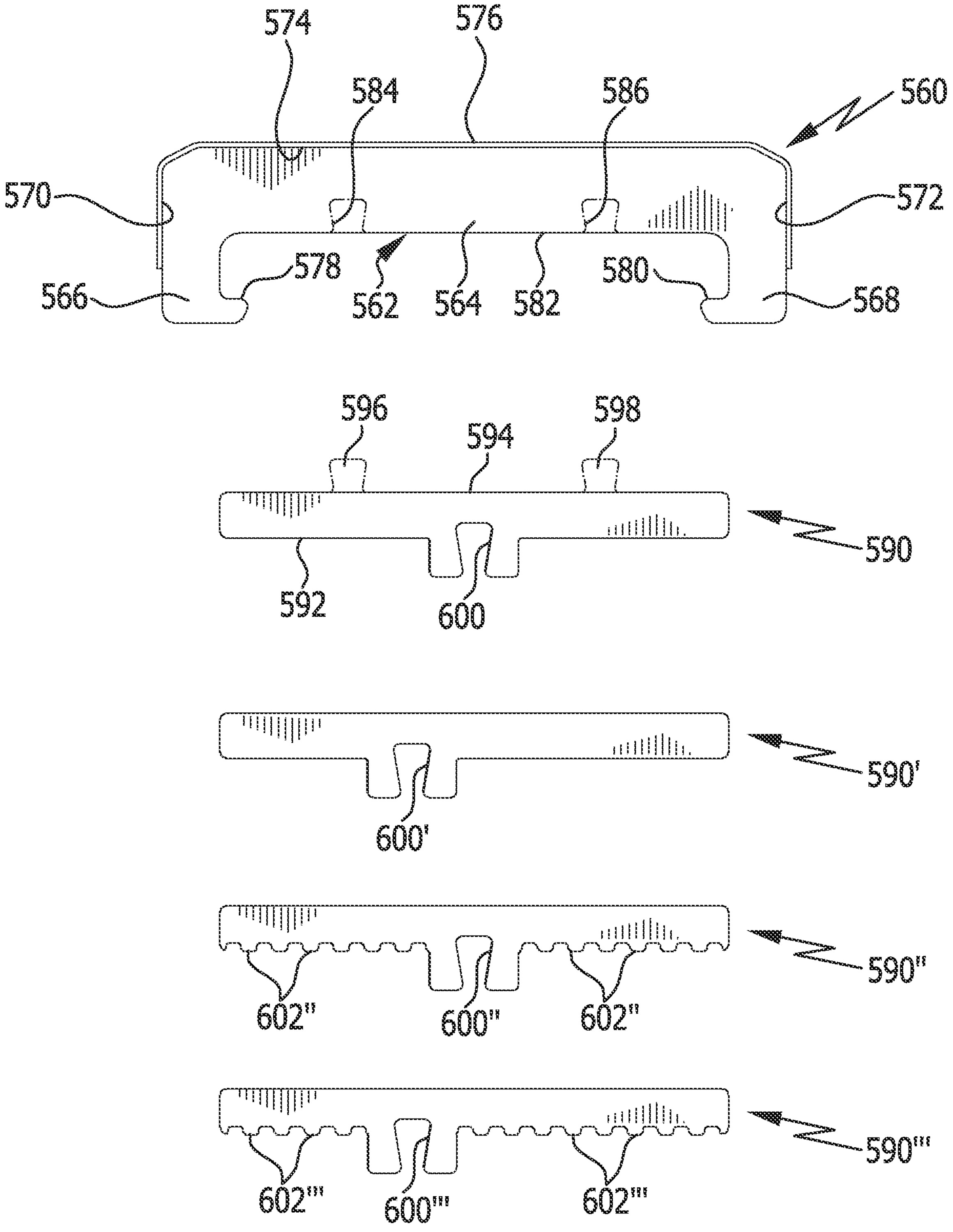
FIG. 11 shows a further embodiment of a spacer according to the invention, with a plurality of variations of a functional element.

FIG. 11 shows a further embodiment of the present invention in the form of a spacer 560. The spacer 560 has a profiled body 562 with a base body 564 and two lateral walls 566, 568 that are integrally formed on the base body 564, to either side thereof, and provide the lateral faces 570, 572 of the profiled body 562.

The spacer 560 has on its outer surface 574 a barrier layer 576 that extends from the first lateral face 570, over the outer face of the base body to the lateral face 572, and also covers large parts of the lateral faces 570, 572, forming the lateral surfaces of the spacer 560.

Provided at the free ends of the lateral walls 566, 568 are functional elements that are integrally formed on the free ends as latching projections 578, 580 facing the respectively other lateral wall.

The latching projections 578, 580 are at a spacing from the inner face 582 of the base body 564 and are thus suitable for holding, with positive locking between them and the inner face 582, a separately manufactured component for the purpose of creating further functionalities for the spacer 560.

For the purpose of holding such components on the spacer 560 according to the invention with positive locking, it is possible to provide, as an alternative or in addition, grooves 584, 586 in the base body 566, in the region of the inner face 582.

FIG. 11 shows some variations of an exemplary component 590 that is suitable for creating further functionalities for the spacer 560, and which has a substantially strip-like base body 592 that can be held with positive locking by the latching projections 578, 580 such that it abuts against the inner face 582 in combination with the base body 564 of the spacer 560. In this arrangement, the component 590 extends from the one lateral wall 566 of the profiled body 562 to the other 568.

As an alternative or in addition, the base body 592 of the functional component 590 may be equipped with projections 596, 598 on its surface 594 that, in the mounted condition, faces the inner face 582, wherein the projections 596, 598 are preferably shaped to be complementary with the grooves 584, 586 in the base body 564 of the spacer 560, such that the projections 596, 598 are connectable to the grooves 584, 586 with positive locking.

On its opposite side to the surface 594 of the base body, the component 590 may have a centrally arranged receptacle 600 for a third glass pane (not illustrated). The spacer 560 can thus be used both for double glazing and triple glazing, and in the latter case needs only to be retrofitted with the functional component 590.

In a first variation, in the case of the functional component 590' the receptacle 600' can be arranged off-centre, with the result that it is possible, in a triple glazing produced therewith, to create an inner space between the panes that is divided into a smaller and a larger sub-volume.

In a second variant of the functional component 590", it has, centrally, the receptacle 600" for a third glass pane and moreover a structured surface with ribs 602" that are spaced from one another regularly and mutually parallel and run in the longitudinal direction of the component 590". This allows the spacer 560 to be modified in appearance on its surface that faces the inner space of the insulating glass unit and is thus visible in the installed condition.

In a third variant of the functional component 590'", the receptacle 600'" is positioned off-centre, and the surface is once again modified in appearance by ribs 602'".

Because the functional components are manufactured separately, the choice of material for their manufacture is freely selectable. In particular, the material need not necessarily be selected depending on its coilability, since the functional components may indeed be connected to the spacer only immediately before manufacture of the spacer frame.

Figure 12A:
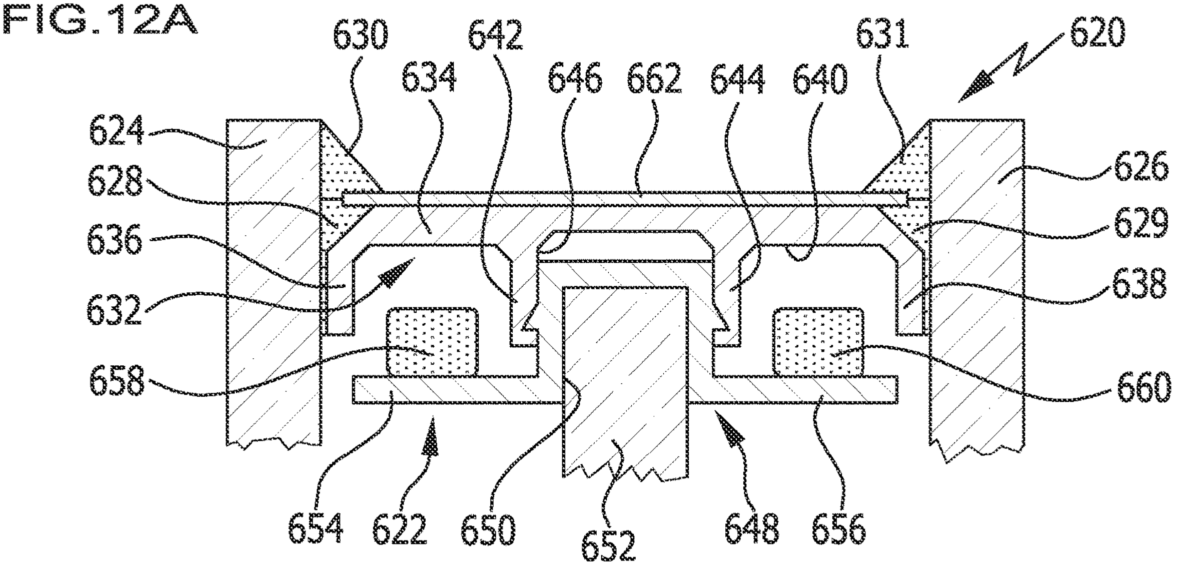
FIGS. 12A to 12C show further embodiments of the spacer according to the invention with different functional elements, in the condition installed in an insulating glass unit.
Figure 12B:
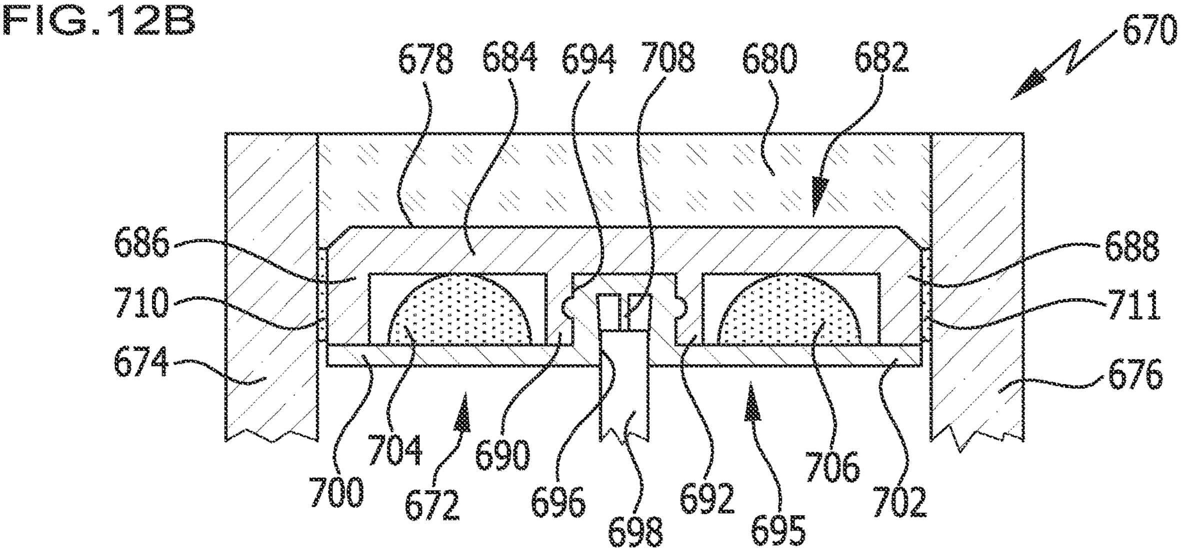
Figure 12C:
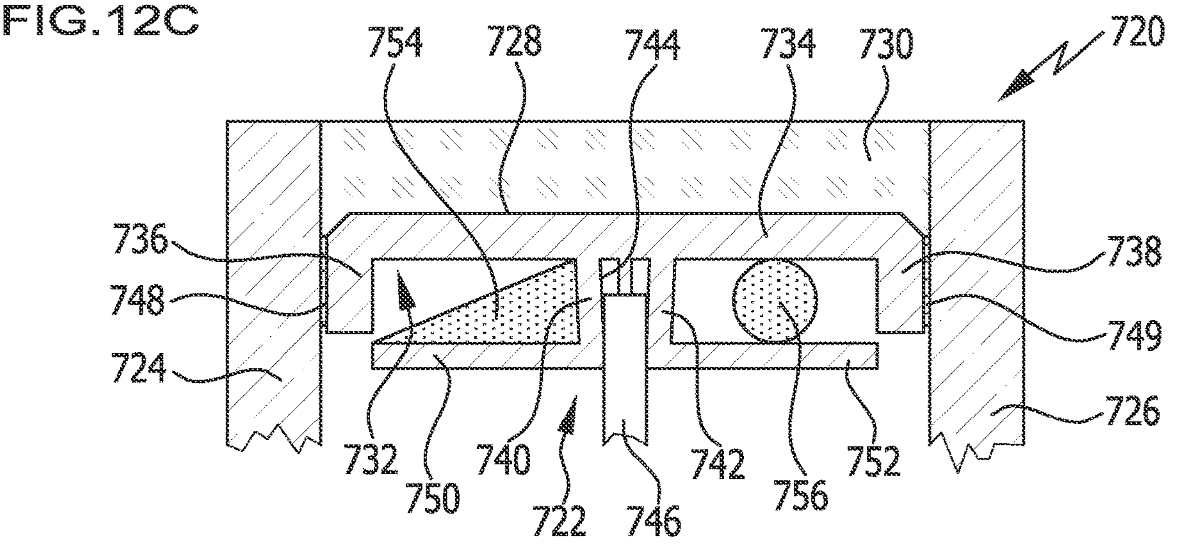

FIGS. 12A to 12C show further examples of spacers according to the invention that have functional elements by means of which further, customised functionalities may easily be created for the spacers where necessary.

FIG. 12A shows a spacer 622 according to the invention in the condition in which it is installed at the edge of an insulating glass unit 620. The spacer 622 has a first and a second glass pane 624, 626 at a predetermined spacing, and is firmly connected to these by a primary butyl sealant 628, 629 and a secondary sealant (for example polysulfide, polyurethane, silicone or hot melt butyl) 630, 631.

The spacer 622 has a profiled body 632 with a base body 634 and two lateral walls 636, 638 that are formed parallel to one another on either side of the base body 634 and of which the outer lateral faces form the lateral surfaces of the spacer 622, which are in contact with the glass panes 624, 626.

Integrally formed on its inner face 640 are functional elements in the form of latching projections 642, 644, and these protrude perpendicularly from the base body 634 of the profiled body 632 and extend parallel and mutually spaced in the longitudinal direction of the spacer. Formed between the latching projections 642, 644 is a groove-like receptacle 646 in which a functional component 648 can be inserted and held with positive locking by the latching projections 642, 644.

In the present exemplary embodiment, the functional component 648 is intended to have a plurality of functions. A first function consists in providing a groove 650 for receiving the edge of a third glass pane 652. Further functions are taken on by two planar elements 654, 656, which extend in opposite directions on either side of the groove 650, towards the first and the second glass pane. The planar elements 654, 656 on the one hand cover the inner face of the base body 634 and so provide the possibility of modifying the appearance of the spacer 622. Moreover, the planar elements 654, 656 of the functional component 648 create fillable cavities on their sides facing the profiled body 632, which in the present exemplary embodiment are charged with desiccant bodies 658, 660 that provide an additional moisture absorption capacity. The desiccant bodies 658, 660 may in this case fill the cavities entirely or—as shown here—partly, as required.

The spacer 622 may be equipped with a stainless steel strip 662 on its outer surface. The stainless steel strip 662 takes on the function of a barrier layer that extends rectilinearly, substantially from the first glass pane 624 to the second glass pane 626, and projects somewhat towards the lateral faces. As a result, a barrier layer on the lateral faces can be dispensed with, since the primary butyl sealant also adjoins the stainless steel strip from below and, together with the stainless steel strip, creates a continuous sealing plane. Because of the planar form taken by the stainless steel strip 662, a relatively large material thickness can be used for it, with the spacer nonetheless remaining readily coilable.

FIG. 12B shows an edge region of an insulating glass unit 670 having two glass panes 674, 676 that are held at a spacing by a spacer 672 according to the invention.

A secondary sealant 680 is applied to the outer surface 678 of the spacer 672, extending in the transverse direction of the insulating glass unit 670 over the entire width of the spacer 672, from the glass pane 674 to the glass pane 676. Provided between the lateral walls 686, 688 and the glass panes is a primary butyl sealant 710, 711.

The spacer has a profiled body 682 with a base body 684 on either side of which lateral walls 686, 688 are integrally formed. Integrally formed on the base body 684, on the inner face thereof remote from the outer surface 678, are two strip-like latching projections 690, 692 that form a receptacle 694 between them. A functional component 695 can be inserted with positive locking in the receptacle 694.

Here, similarly to the embodiment shown in FIG. 12A, the functional component 695 has a plurality of functions. First, the functional component 695 forms a receiving groove 696 in which a third glass pane 698 can be inserted by means of its edge region. Further, two planar elements 700, 702 that extend from the region of the groove 696 in both directions to the glass panes 674, 676 and the lateral walls 686, 688 form, together with the profiled body 682 of the spacer 672, closed hollow chambers on either side of the latching projections 690, 692, which can be charged with desiccant bodies 704, 706 in order to adjust the moisture absorption capacity of the spacer 672 to a predetermined value. Moreover, the planar elements 700, 702 serve to create the appearance taken by the spacer 672 on its visible side in the mounted condition.

It is possible for a web-like projection 708 to be provided in the receiving groove 696 so that the central glass pane 698 is not pushed right to the root of the groove during assembly. As a result of the corresponding configuration of the projection 708, it is possible for it to be compressed in the event of a high degree of thermal expansion of the central pane. This is particularly important in the case of panes made of plastics material, which have considerably greater thermal expansion than glass panes. In this case the projection 708 acts in the manner of a spring that can be compressed when necessary.

Finally, FIG. 12C shows an edge region of an insulating glass unit 720 having two glass panes 724, 276 that are held at a spacing by a spacer 722 according to the invention.

A secondary sealant 730 is applied to the outer surface 728 of the spacer 722, extending in the transverse direction of the insulating glass unit 720 over the entire width of the spacer 722, from the glass pane 724 to the glass pane 726.

Provided between the lateral walls 736, 738 and the glass panes 724, 726 is a primary butyl sealant 748, 749.

The spacer 722 has a profiled body 732 with a base body 734 on either side of which lateral walls 736, 738 are integrally formed. Integrally formed on the base body 734, on the inner surface thereof remote from the outer surface 728, are two strip-like latching projections 740, 742 that form a receptacle 744 between them. A third glass pane 746 can be inserted in the receptacle 744 with positive locking.

Further, the profiled body 732 of the spacer 722 has two planar elements 750, 752 that extend from the region of the projections 740, 742 forming the groove 744 in both directions to the glass panes 724, 726 and the lateral walls 736, 738 and, together with the base body 734 of the spacer 722, form substantially closed hollow chambers on either side of the projections 740, 742, which can be charged with desiccant bodies 754, 756 in order to adjust the moisture absorption capacity of the spacer 722 to a predetermined value. Moreover, the planar elements 750, 752 serve to create the appearance taken by the spacer 722 on its visible side in the mounted condition.

FIGS. 13A to 13F, by means of a spacer 10 according to the invention as seen in FIG. 1A, show different ways of joining together end regions of a spacer according to the invention. This applies both to the end regions of coiled spacers and to the end regions of a portion of a spacer that has already been cut to length in order to form a frame of an insulating glass unit.

Figure 13A:
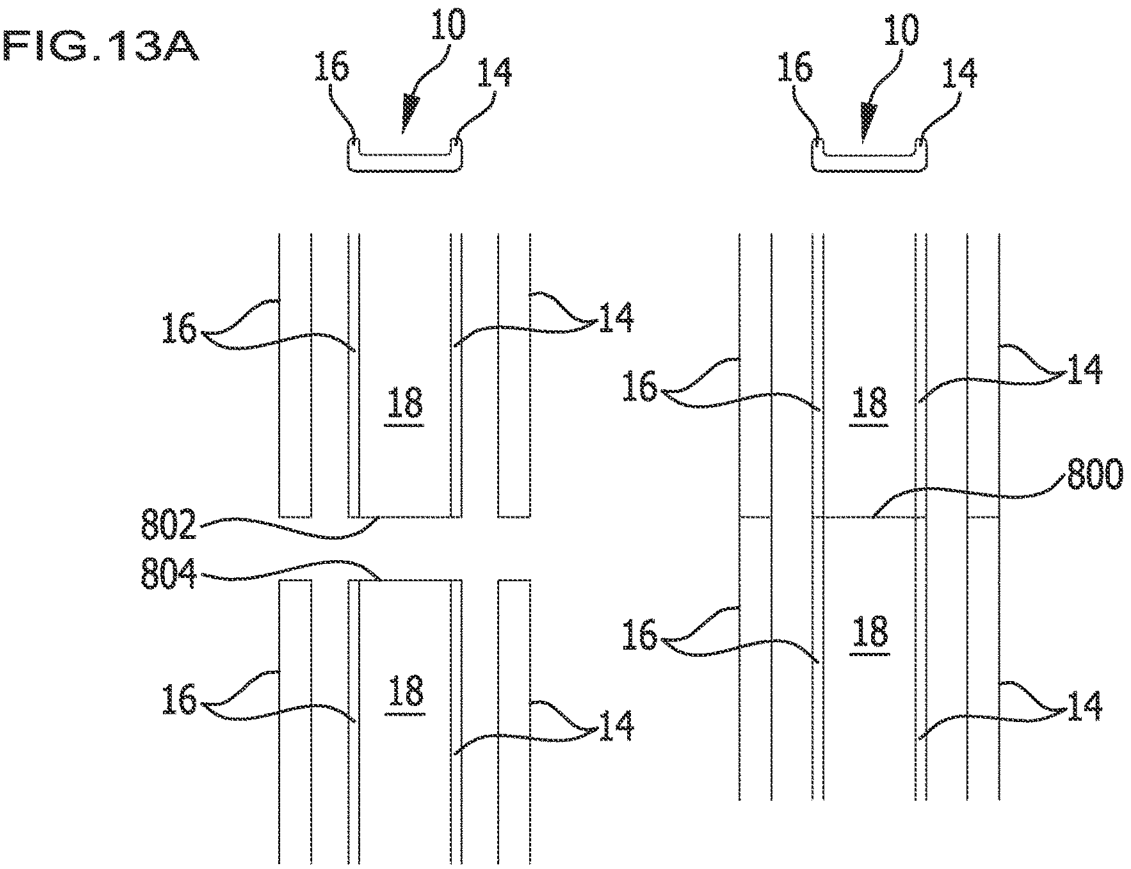
FIGS. 13A to 13F show different versions of the making of a connection between two spacer end regions of the spacer in FIG. 1A.

FIG. 13A illustrates the production of a butt joint 800 of spacer end regions 802, 804 by means of plastics welding, for example using an ultrasound welding or mirror welding technique. The upper part of the illustration is a sectional view perpendicular to the longitudinal direction of the spacer. The central part of the illustrations shows the spacer end regions 802, 804 in a plan view of the base body 18, and the illustrations to the side thereof respectively show a lateral view of the lateral walls 14 and 16. The welded butt joint 800 preferably extends from a lateral wall 14, over the base body 18 to the lateral wall 16.

Figure 13B:
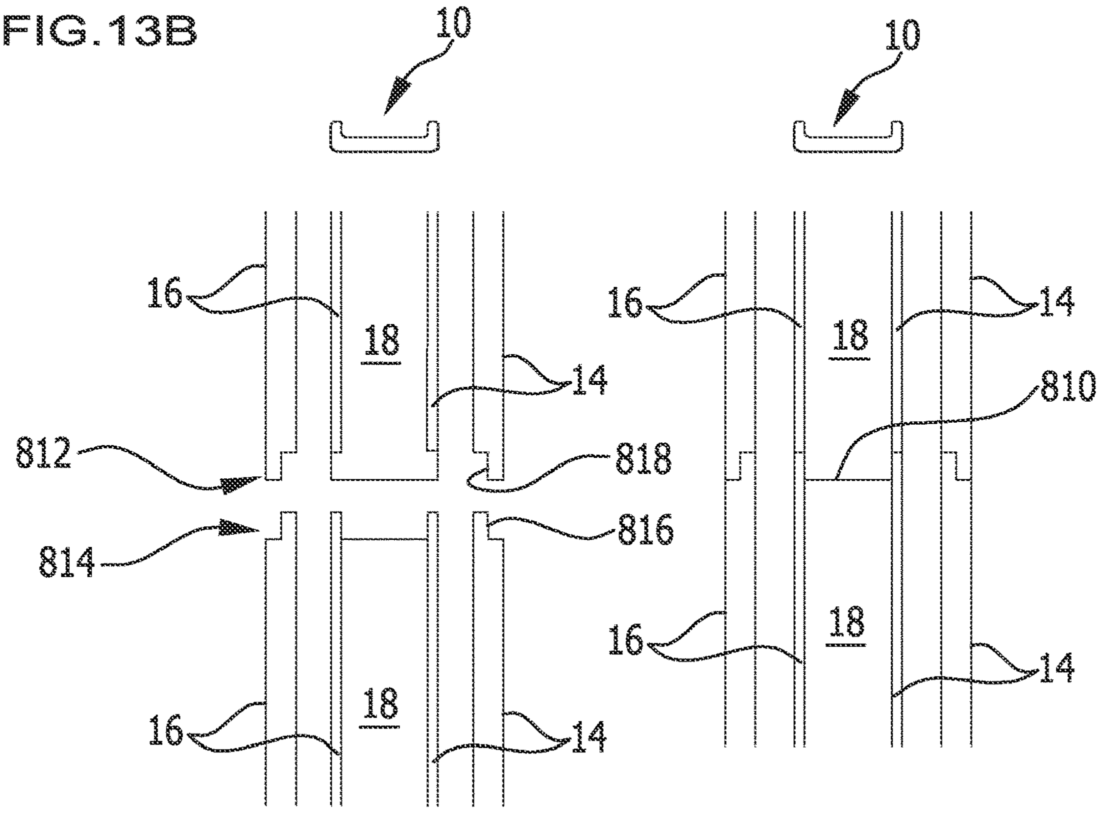

FIG. 13B illustrates the production of a further variant of a butt joint 810 of modified spacer end regions 812, 814 by means of plastics welding, for example using an ultrasound welding or mirror welding technique, or indeed using an adhesive technique, for example with the aid of a metal adhesive tape (not illustrated). The two end regions 812, 814 are respectively provided with complementary projections and recesses 816, 818 (for example for a tongue-and-groove connection).

Once again, the central part of the illustrations shows the spacer end regions 812, 814 in a plan view of the base body 18, and the illustrations to the side thereof respectively show a lateral view of the lateral walls 14 and 16. The welded butt joint 810 preferably extends from a lateral wall 14, over the base body 18 to the lateral wall 16.

Figure 13C:
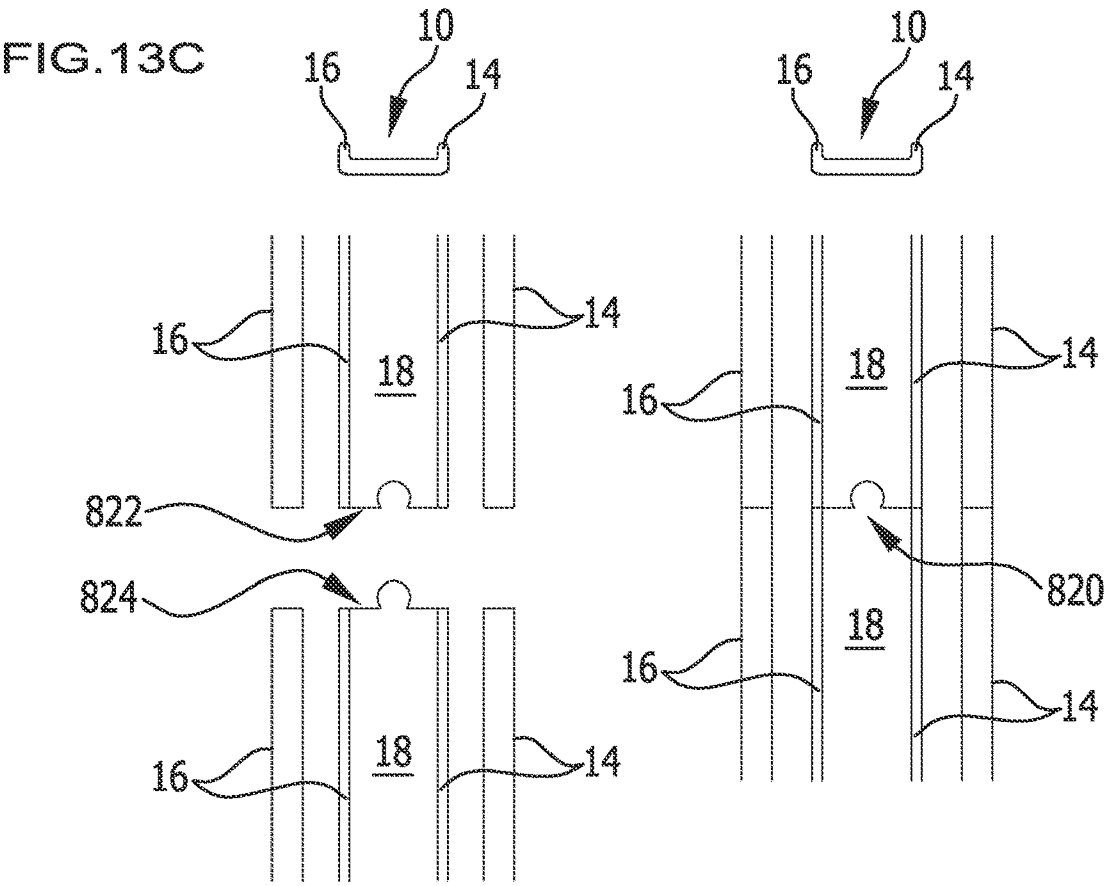

FIG. 13C illustrates the production of a further variant of a butt joint 820 of spacer end regions 822, 824 by means of a positively locking clip connection, which where appropriate may additionally be secured by plastics welding, for example using an ultrasound welding or mirror welding technique, or indeed using an adhesive technique, for example with the aid of a metal adhesive tape (not illustrated).

Once again, the central part of the illustrations shows the spacer end regions 822, 824 in a plan view of the base body 18, and the illustrations to the side thereof respectively show a lateral view of the lateral walls 14 and 16. The butt joint 820, where appropriate secured by welding, preferably extends from a lateral wall 14, over the base body 18 to the lateral wall 16.

Figure 13D:
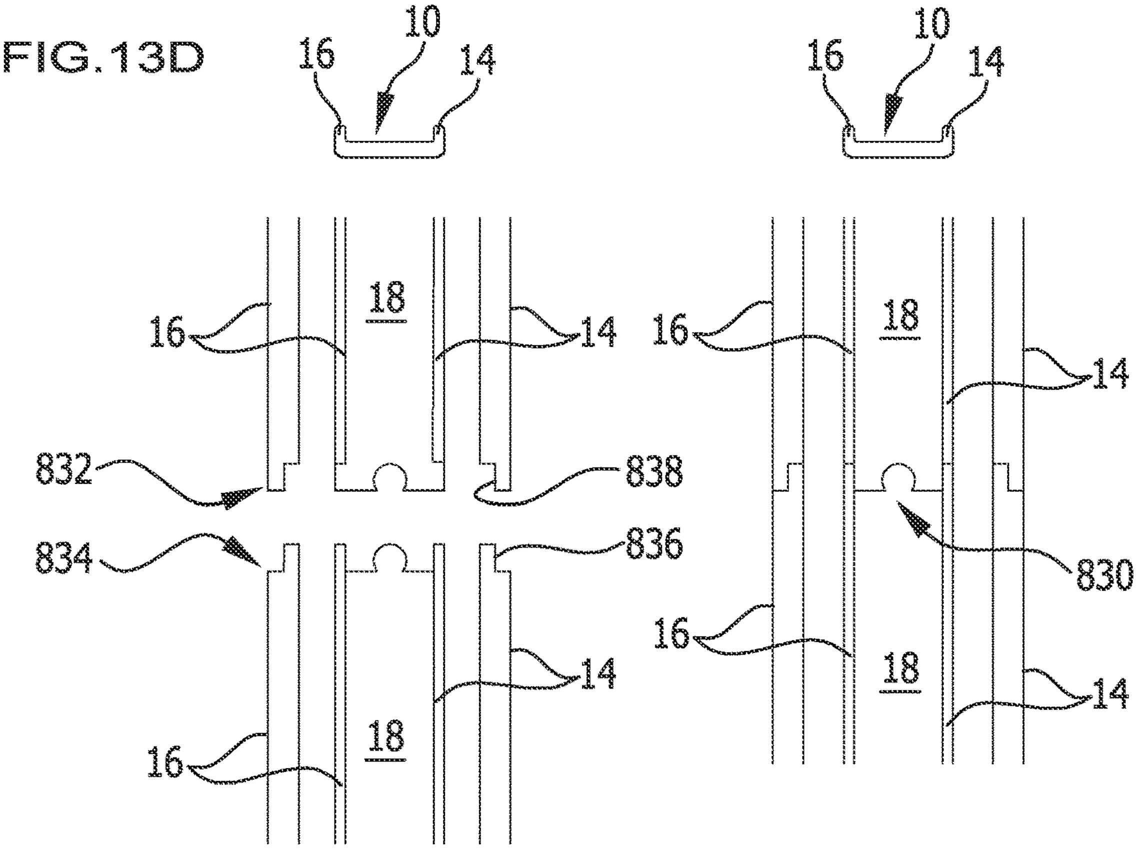

FIG. 13D illustrates the production of a further variant of a butt joint 830 of spacer end regions 832, 834 by means of a positively locking clip connection, which where appropriate may be secured by plastics welding, for example using an ultrasound welding or mirror welding technique, or indeed using an adhesive technique, for example with the aid of a metal adhesive tape (not illustrated). For this purpose, the end regions 832, 834 are provided with complementary projections and recesses 836, 838 in the region of the lateral walls 14, 16, in a manner analogous to the variant of FIG. 13B.

Once again, the central part of the illustrations shows the spacer end regions 832, 834 in a plan view of the base body 18, and the illustrations to the side thereof respectively show a lateral view of the lateral walls 14 and 16. The butt joint 830, where appropriate additionally secured by welding, preferably extends from a lateral wall 14, over the base body 18 to the lateral wall 16.

Figure 13E:
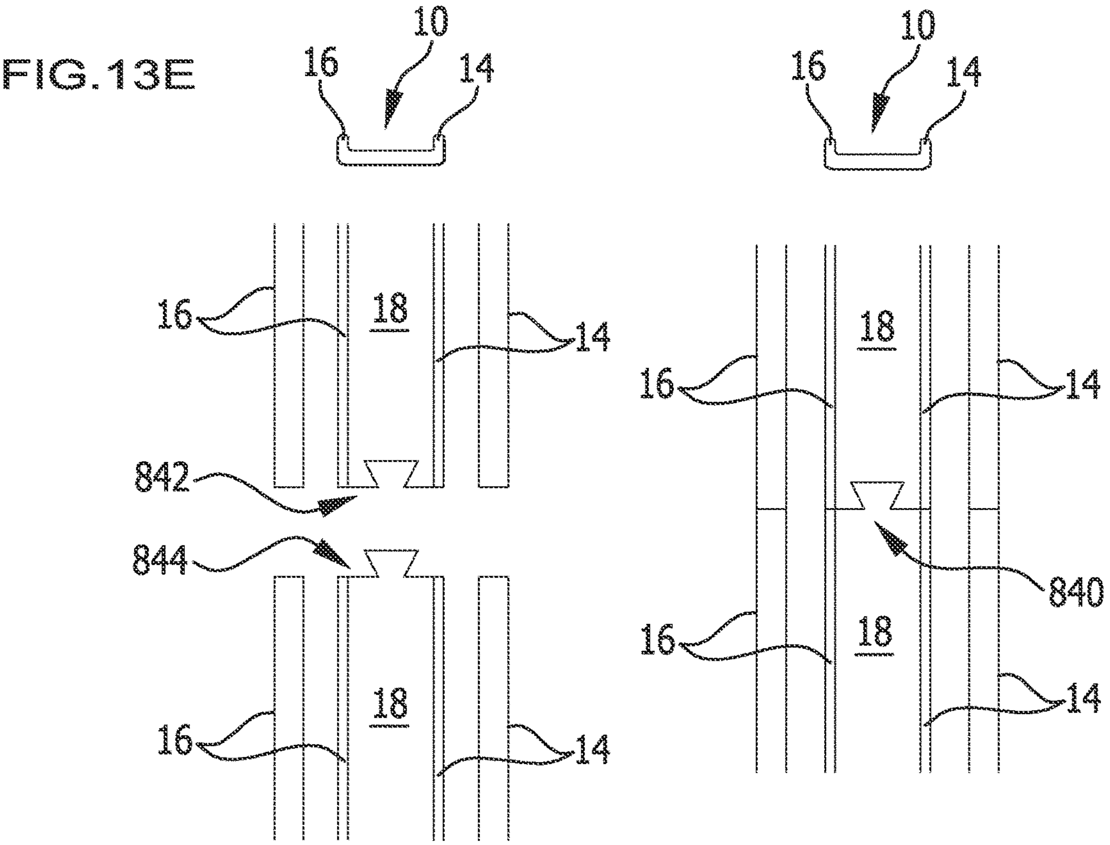

FIG. 13E illustrates the production of a further variant of a butt joint 840 of spacer end regions 842, 844 by means of a positively locking connection (in this case a dovetail joint in the region of the base body 18), which where appropriate may additionally be secured by plastics welding, for example using an ultrasound welding or mirror welding technique, or indeed using an adhesive technique, for example with the aid of a metal adhesive tape (not illustrated).

Once again, the central part of the illustrations shows the spacer end regions 842, 844 in a plan view of the base body 18, and the illustrations to the side thereof respectively show a lateral view of the lateral walls 14 and 16. The butt joint 840, where appropriate additionally secured by welding, preferably extends from a lateral wall 14, over the base body 18 to the lateral wall 16.

Figure 13F:
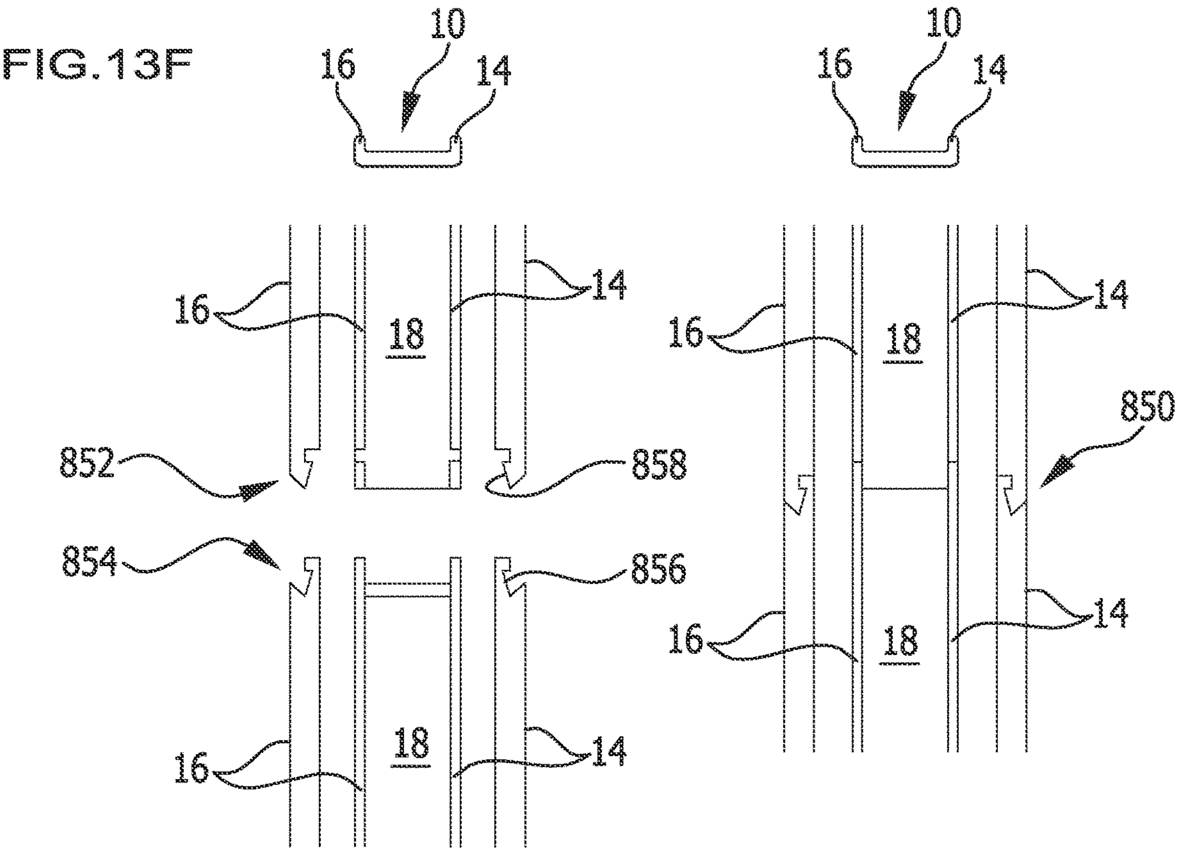

FIG. 13F illustrates the production of a further variant of a butt joint 850 of spacer end regions 852, 854 by means of a positively locking hook-and-clip connection of the lateral walls 14, 16, which for this purpose are provided at the end regions 852, 854 with hook-shaped complementary projections and recesses 856, 858. Where appropriate, the butt joint 850 may additionally be secured by plastics welding, for example using an ultrasound welding or mirror welding technique, or indeed using an adhesive technique, for example with the aid of a metal adhesive tape (not illustrated).

Once again, the central part of the illustrations shows the spacer end regions 852, 854 in a plan view of the base body 18, and the illustrations to the side thereof respectively show a lateral view of the lateral walls 14 and 16. The butt joint 850, where appropriate secured by welding, preferably extends from a lateral wall 14, over the base body 18 to the lateral wall 16.

It is common to all embodiments in FIG. 13 that the spacer end regions can be held in position against one another when a spacer frame is closed, as a result of which manufacture of the insulating glass units is simplified.

Moreover, the connection techniques shown can also be used to use up offcut pieces of spacers when a spacer frame is manufactured.

The connection techniques shown with reference to the spacer 10 in FIG. 13 can also be used analogously on all spacers according to the invention, in particular also on spacers according to the invention that have a relatively complex geometry, such as that of the spacers 120 and 460 in FIGS. 3A and 9C respectively.

The invention claimed is:

1. A spacer for insulating glass units, wherein the spacer is formed having an inner surface, an outer surface and two lateral surfaces extending at either side of the spacer from the inner surface to the outer surface, and wherein the spacer comprises a profiled body, wherein the profiled body comprises two mutually spaced lateral faces running parallel to the a longitudinal direction of the profiled body, and a base body that extends between the lateral faces and has an outer and an inner face, wherein the profiled body is made from a plastics material and comprises at least in one part volume a quantity of particulate desiccant that is embedded in the plastics material, wherein the spacer has a coilability about an axis, perpendicularly to the lateral surfaces, such that there is a deflection of the spacer of approximately 1 mm or more, by comparison with an unloaded condition, wherein the deflection is determined at the outer surface of the spacer as the outer surface thereof lies on two supporting bodies at a loading span Ls of 100 mm, as measured in a longitudinal direction of the spacer, and with a force F of 50 N acting in a centre of the loading span Ls, wherein the force F is introduced into the spacer perpendicularly to a support plane defined by the two supporting bodies.

2. The spacer according to claim 1, wherein reinforcing elements are embedded in the plastics material of the profiled body.

3. The spacer according to claim 1, wherein on either side of the base body the profiled body has lateral walls that extend from the base body and beyond an inner face of the profiled body_by approximately 0.5 mm or more, and form the lateral faces of the profiled body.

4. The spacer according to claim 1, wherein the spacer has a height H of approximately 5 mm or less.

5. The spacer according to claim 1, wherein the spacer has a width B of approximately 14 mm to approximately 40 mm.

6. The spacer according to claim 5, wherein the spacer is intended for triple glazing and has a width of approximately 30 mm or more and an aspect ratio A, as seen in a cross section perpendicular to a longitudinal direction, defined as a quotient of the width B of the spacer and the height H of the spacer (A=B/H), wherein the aspect ratio A has a value of approximately 6 or more.

7. The spacer according to claim 1, wherein the particulate desiccant is selected from silicates, sulfates, oxides in the form of zeolite, 3A zeolite with an average pore size of approximately 3 angstroms, calcium sulfate, silica gel, layered silicate, tectosilicate, phosphorus oxide, aluminium oxide, alkali metal oxide and/or alkaline earth metal oxide or mixtures thereof.

8. The spacer according to claim 1, wherein the particulate desiccant is embedded in the plastics material in a proportion of approximately 35 weight % to approximately 45 weight % in relation to a total weight of the profiled body.

9. The spacer according to claim 1, wherein the particulate desiccant is embedded in the plastics material in the form of granules and/or a powder.

10. The spacer according to claim 1, wherein the plastics material of the profiled body is selected such that after storage in a standard atmosphere (50% +10% relative air humidity at a temperature of 23° C.±2° C.) for a storage period of 48 hours the spacer has a moisture content of approximately 50% or less of a maximum moisture absorption capacity.

11. The spacer according to claim 1, wherein the spacer has on the inner surface a continuous groove parallel to the lateral surfaces and at a spacing from each of the lateral surfaces, for receiving a glass pane edge of a further glass pane.

12. The spacer according to claim 11, wherein the spacer has on the inner surface two mutually spaced projections that run parallel to the longitudinal direction of the spacer and between which the groove is formed.

13. The spacer according to claim 1, wherein the plastics material of the profiled body has, at least in certain regions, a pore structure, wherein the average pore size is approximately 5 μm to approximately 150 μm, and wherein a pore volume is approximately 40% by volume or less of a volume of the profiled body.

14. The spacer according to claim 1, wherein the profiled body has, on an outer and/or inner face of the base body and/or on the lateral walls, recesses that run substantially transversely to a longitudinal direction of the profiled body at regular intervals.

15. The spacer according to claim 1, wherein the spacer has on the outer surface a barrier layer that has a barrier effect in respect of gases and/or air moisture, wherein the barrier layer is selected from a metal foil, a multiple-layer foil with a polymer-based backing film and at least one layer of metal, metal oxide or ceramic, a coating of platelet-like nanoparticles, a flexible glass layer, a diffusion-inhibiting polymer film or a polymer film laminate.

16. The spacer according to claim 1, wherein the spacer has on the outer surface a barrier layer that has a barrier effect in respect of gases and/or air moisture, wherein the barrier layer takes the form of a coating on the profiled body and comprises a layer of metal, metal oxide or ceramic nanoparticles.

17. An insulating glass unit having two outer glass panes that are held at a predetermined spacing by a spacer frame, wherein the spacer frame comprises a spacer according to claim 1.

18. The insulating glass unit according to claim 17, wherein the two outer glass panes are bonded to the spacer by means of a primary sealant in the region of the lateral surfaces, wherein the primary sealant is selected from synthetic rubber, polyisobutylene, butyl rubber, polyurethane, silicone polymer, silane-modified polymer, polysulfide and polyacrylate.

19. The insulating glass unit according to claim 17, wherein the spacer has a groove on an inner surface side, in which an edge of a third glass pane is inserted.

20. The spacer according to claim 1, wherein the spacer has a flexural strength in a plane perpendicular to the lateral surfaces, at which a deflection of the spacer is approximately 10 mm or less by comparison with an unloaded condition, wherein the deflection is determined at a lateral surface as the lateral surface lies on two supporting bodies at a loading span of 100 mm, as measured in a longitudinal direction of the spacer, and with a force of 100 N acting in a centre of the loading span, wherein the force of 100 N is introduced into the spacer perpendicularly to the lateral surface.

* * * * *